US011901931B2

(12) United States Patent
Sun et al.

(10) Patent No.: US 11,901,931 B2
(45) Date of Patent: Feb. 13, 2024

(54) TRANSMIT DIVERSITY POWER LEAKAGE DETECTION AND FILTERING IN ANTENNA COMPENSATOR POWER DETECTOR

(71) Applicant: QUALCOMM Incorporated, San Diego, CA (US)

(72) Inventors: Lei Sun, Irvine, CA (US); Sean Vincent Maschue, Encinitas, CA (US); Cheng Tan, Denver, CO (US); Bruce Charles Fischer, Jr., Lafayette, CO (US); Brian French, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 17/471,095

(22) Filed: Sep. 9, 2021

(65) Prior Publication Data

US 2023/0076071 A1    Mar. 9, 2023

(51) Int. Cl.
    *H04B 1/525*   (2015.01)
    *H04B 17/10*   (2015.01)
    *H04B 1/12*    (2006.01)

(52) U.S. Cl.
    CPC ............... *H04B 1/525* (2013.01); *H04B 1/12* (2013.01); *H04B 17/102* (2015.01)

(58) Field of Classification Search
    CPC ......... H04B 1/525; H04B 1/12; H04B 17/102
    See application file for complete search history.

(56) References Cited

U.S. PATENT DOCUMENTS

| 8,149,749 | B2 * | 4/2012 | Maeda | H04W 72/04 370/328 |
| 8,175,535 | B2 * | 5/2012 | Mu | H03F 1/02 455/283 |
| 8,320,842 | B2 * | 11/2012 | Rousu | H04B 1/0057 455/78 |
| 8,325,632 | B2 * | 12/2012 | Gorbachov | H04B 7/0817 343/835 |

(Continued)

FOREIGN PATENT DOCUMENTS

| CA | 2873411 A1 * | 11/2013 | ............. H04B 1/123 |
| CA | 2873411 C  * | 6/2020  | ............. H04B 1/123 |

(Continued)

*Primary Examiner* — Berhanu Tadese
(74) *Attorney, Agent, or Firm* — Holland & Hart LLP

(57) ABSTRACT

Methods, systems, and devices for wireless communications are described. A user equipment (UE) may filter leaked power from a signal to accurately perform antenna compensation operations (e.g., apply a transmit gain, perform cable loss measurements) using valid power. A switch at the UE may leak power to an antenna for a transmission, and the UE may use a dynamic filtering algorithm to determine whether a pulse power of a detected signal is leaked or valid. The dynamic filtering algorithm may be able to account for variations in leaked power values, as leaked power may increase or decrease proportionally to intended power (e.g., from which power was leaked). By determining whether pulse power is leaked or valid, the UE may be able to filter out the leaked power and accurately perform antenna compensation operations such as applying a transmit gain for a transmission, performing a cable loss measurement, or the like.

30 Claims, 13 Drawing Sheets

(56) References Cited

U.S. PATENT DOCUMENTS

| | | | |
|---|---|---|---|
| 8,422,540 B1* | 4/2013 | Negus | H04W 24/02 375/219 |
| 8,526,903 B2* | 9/2013 | Gudem | H04B 1/525 455/296 |
| 8,948,235 B2* | 2/2015 | Negus | H01Q 21/062 375/219 |
| 9,025,646 B2* | 5/2015 | Aparin | H04B 1/40 375/221 |
| 9,042,838 B2* | 5/2015 | Braithwaite | H04B 1/525 455/501 |
| 9,083,441 B2* | 7/2015 | Sahota | H04B 1/581 |
| 9,100,099 B2* | 8/2015 | Loh | H04B 1/525 |
| 9,124,367 B2* | 9/2015 | Wigren | H04B 17/309 |
| 9,215,686 B2* | 12/2015 | Kazmi | H04B 17/27 |
| 9,252,831 B2* | 2/2016 | Rimini | H04B 1/525 |
| 9,520,945 B2* | 12/2016 | Gerszberg | H04B 3/54 |
| 9,537,518 B2* | 1/2017 | Langer | H04B 1/0475 |
| 9,596,001 B2* | 3/2017 | Gerszberg | H04Q 9/00 |
| 9,602,149 B1* | 3/2017 | Tanzi | H04L 5/1461 |
| 9,713,010 B2* | 7/2017 | Khandani | H04B 7/026 |
| 9,722,713 B2* | 8/2017 | Tanzi | H04B 1/525 |
| 9,900,060 B1* | 2/2018 | Keehr | H03H 7/185 |
| 9,948,355 B2* | 4/2018 | Gerszberg | H04B 7/04 |
| 9,973,370 B1* | 5/2018 | Langer | H03F 3/3258 |
| 10,020,837 B2* | 7/2018 | Braithwaite | H04L 5/0048 |
| 10,135,472 B1* | 11/2018 | Ashry Othman | H04B 1/0475 |
| 10,171,158 B1* | 1/2019 | Barzegar | H04B 7/14 |
| 10,187,120 B1* | 1/2019 | Keehr | H01P 5/18 |
| 10,200,106 B1* | 2/2019 | Barzegar | H04B 1/40 |
| 10,326,539 B2* | 6/2019 | Lloyd | H04B 17/0085 |
| 10,396,839 B2* | 8/2019 | Cohen | H04B 1/12 |
| 10,419,061 B2* | 9/2019 | Beamish | H04B 17/318 |
| 10,469,156 B1* | 11/2019 | Barzegar | H04B 7/15528 |
| 10,499,409 B2* | 12/2019 | Shattil | H04W 76/14 |
| 10,516,469 B2* | 12/2019 | Barzegar | H04B 1/005 |
| 10,536,212 B2* | 1/2020 | Barzegar | H04B 3/54 |
| 10,554,235 B2* | 2/2020 | Vannucci | H04B 1/38 |
| 10,686,477 B2* | 6/2020 | Chen | H04B 1/525 |
| 10,701,639 B2* | 6/2020 | Maeda | H04W 76/28 |
| 10,728,857 B2* | 7/2020 | Maeda | H04W 52/0216 |
| 10,742,388 B2* | 8/2020 | Khandani | H04W 12/04 |
| 10,749,569 B2* | 8/2020 | Barzegar | H04B 3/56 |
| 10,756,806 B2* | 8/2020 | Barzegar | H04B 17/336 |
| 10,797,387 B2* | 10/2020 | Shi | H04B 17/102 |
| 10,826,548 B2* | 11/2020 | Vannucci | H04B 7/0413 |
| 10,972,150 B2* | 4/2021 | Keehr | H04B 5/0062 |
| 11,050,468 B2* | 6/2021 | Perlman | H04L 5/14 |
| 11,197,308 B1* | 12/2021 | Shattil | H04W 12/08 |
| 11,205,857 B2* | 12/2021 | Rappaport | H04W 52/42 |
| 11,290,162 B2* | 3/2022 | Perlman | H04L 5/14 |
| 11,296,764 B2* | 4/2022 | Hormis | H04B 7/0695 |
| 11,303,424 B2* | 4/2022 | Khandani | H04W 16/14 |
| 11,452,032 B2* | 9/2022 | Gupta | H04W 52/0261 |
| 11,477,613 B2* | 10/2022 | Bao | H04W 4/70 |
| 11,510,260 B2* | 11/2022 | Monajemi | H04L 1/0003 |
| 11,533,079 B2* | 12/2022 | Bennett | H04W 4/21 |
| 11,533,088 B2* | 12/2022 | Fakoorian | H04W 16/14 |
| 11,569,894 B1* | 1/2023 | Gao | H04B 7/0888 |
| 11,576,067 B2* | 2/2023 | Berger | H04L 5/005 |
| 11,641,644 B2* | 5/2023 | Badic | H04W 40/24 370/329 |
| 11,653,292 B2* | 5/2023 | Azizi | H04W 68/005 370/329 |
| 2009/0285135 A1* | 11/2009 | Rousu | H04B 1/0057 370/297 |
| 2013/0109330 A1* | 5/2013 | Sahota | H04B 1/525 455/77 |
| 2014/0029586 A1* | 1/2014 | Loehr | H04L 5/0055 370/336 |
| 2014/0220908 A1* | 8/2014 | Loh | H04B 1/40 455/78 |
| 2015/0215887 A1* | 7/2015 | Nejatian | H04W 56/0045 370/350 |
| 2015/0303984 A1* | 10/2015 | Braithwaite | H04B 1/48 455/78 |
| 2015/0372725 A1* | 12/2015 | Langer | H04B 1/0475 375/297 |
| 2016/0134342 A1* | 5/2016 | Kneckt | H04B 7/0417 375/267 |
| 2017/0176507 A1* | 6/2017 | O'Keeffe | H04B 17/19 |
| 2017/0331577 A1* | 11/2017 | Parkvall | H04L 5/1469 |
| 2017/0331670 A1* | 11/2017 | Parkvall | H04L 41/0816 |
| 2017/0366209 A1* | 12/2017 | Weissman | H04L 27/38 |
| 2018/0091241 A1* | 3/2018 | Kuttner | H04B 1/525 |
| 2018/0198323 A1* | 7/2018 | Widmer | G01V 3/101 |
| 2018/0213599 A1* | 7/2018 | Kazmi | H04W 24/10 |
| 2019/0090259 A1* | 3/2019 | Oteri | H04W 72/1268 |
| 2019/0173528 A1* | 6/2019 | Keehr | H04B 1/0003 |
| 2020/0015176 A1* | 1/2020 | Li | H04L 1/1861 |
| 2020/0187231 A1* | 6/2020 | Oteri | H04W 28/0242 |
| 2020/0220564 A1* | 7/2020 | Almog | H04B 1/525 |
| 2020/0305075 A1* | 9/2020 | Maeda | H04W 76/28 |
| 2021/0135770 A1* | 5/2021 | Schober | H04L 5/003 |
| 2021/0234580 A1* | 7/2021 | El-Keyi | H04L 25/0204 |
| 2021/0359890 A1* | 11/2021 | Sahraei | H04L 27/2614 |
| 2022/0030456 A1* | 1/2022 | Sundberg | H04B 17/336 |
| 2022/0070705 A1* | 3/2022 | Berger | H04L 1/0026 |
| 2022/0078738 A1* | 3/2022 | Zhang | H04B 7/0695 |
| 2022/0078817 A1* | 3/2022 | Zhang | H04L 5/14 |
| 2022/0109462 A1* | 4/2022 | Fleischer | H04B 1/525 |
| 2022/0174512 A1* | 6/2022 | Rune | H04W 24/10 |
| 2022/0182160 A1* | 6/2022 | Su | H04B 17/309 |
| 2022/0247440 A1* | 8/2022 | Petkov | H04B 17/19 |
| 2022/0286266 A1* | 9/2022 | Negus | H04L 5/1461 |
| 2022/0321241 A1* | 10/2022 | Bennett | H01P 3/16 |
| 2022/0345187 A1* | 10/2022 | Merlin | H04L 1/0027 |
| 2022/0407581 A1* | 12/2022 | Xu | H04B 7/0695 |
| 2023/0006765 A1* | 1/2023 | Kutz | H04L 5/0091 |
| 2023/0014042 A1* | 1/2023 | Barak | H04L 5/0048 |
| 2023/0055304 A1* | 2/2023 | Shim | H04B 17/345 |
| 2023/0076071 A1* | 3/2023 | Sun | H04B 17/12 |
| 2023/0092664 A1* | 3/2023 | Abedini | H04L 5/006 370/329 |
| 2023/0096196 A1* | 3/2023 | Kim | H04L 5/0053 370/329 |
| 2023/0139197 A1* | 5/2023 | Zhang | H04W 72/044 370/329 |
| 2023/0189163 A1* | 6/2023 | Ren | H04B 17/327 370/318 |
| 2023/0224971 A1* | 7/2023 | Abedini | H04L 5/0051 370/329 |

FOREIGN PATENT DOCUMENTS

| | | | | |
|---|---|---|---|---|
| CN | 1454318 A | * | 11/2003 | G01R 29/0821 |
| CN | 101454998 A | * | 6/2009 | H04B 7/15535 |
| CN | 101820945 A | * | 9/2010 | A61N 1/32 |
| CN | 101821956 A | * | 9/2010 | H04B 1/525 |
| CN | 102077503 A | * | 5/2011 | H04B 17/345 |
| CN | 103907290 A | * | 7/2014 | H04B 1/525 |
| CN | 103931111 A | * | 7/2014 | H04B 1/7115 |
| CN | 104052522 A | * | 9/2014 | H04B 1/0475 |
| CN | 101820945 B | * | 10/2014 | A61N 1/32 |
| CN | 104754595 A | * | 7/2015 | |
| CN | 105144592 A | * | 12/2015 | H04B 1/44 |
| CN | 105191157 A | * | 12/2015 | H04B 1/0475 |
| CN | 101821956 B | * | 1/2016 | H04B 1/525 |
| CN | 103907290 B | * | 8/2016 | H04B 1/525 |
| CN | 105191157 B | * | 3/2017 | H04B 1/0475 |
| CN | 103931111 B | * | 10/2017 | H04B 1/7115 |
| CN | 108768457 A | * | 11/2018 | |
| CN | 105812019 B | * | 8/2019 | G01S 7/023 |
| CN | 110098840 A | * | 8/2019 | H04B 1/006 |
| CN | 110301143 A | * | 10/2019 | H04W 12/06 |
| CN | 113632520 A | * | 11/2021 | H04B 17/318 |
| CN | 110301143 B | * | 4/2022 | H04W 12/06 |
| CN | 111490833 B | * | 7/2022 | H04B 17/101 |
| CN | 114900858 A | * | 8/2022 | H04W 12/06 |
| CN | 115694598 A | * | 2/2023 | |
| CN | 115842785 A | * | 3/2023 | |
| DE | 112018006743 T5 | * | 10/2020 | H04B 17/318 |

(56) References Cited

FOREIGN PATENT DOCUMENTS

| | | | | |
|---|---|---|---|---|
| EP | 1124337 A2 * | 8/2001 | ............... | H04B 1/48 |
| EP | 2263321 A1 * | 12/2010 | ............ | H04B 1/525 |
| EP | 2779473 A2 * | 9/2014 | ........... | H04B 1/0475 |
| EP | 2779473 A3 * | 9/2014 | ........... | H04B 1/0475 |
| EP | 2962404 A1 * | 1/2016 | ............... | H04B 1/44 |
| EP | 2974050 A1 * | 1/2016 | ........... | H04B 1/0475 |
| EP | 2263321 B1 * | 6/2016 | ............ | H04B 1/525 |
| EP | 2031775 B1 * | 9/2016 | ........... | H04B 7/2643 |
| EP | 3125443 A1 * | 2/2017 | ........... | H04B 7/2643 |
| EP | 2779473 B1 * | 4/2017 | ........... | H04B 1/0475 |
| EP | 2850733 B1 * | 11/2017 | ............ | H04B 1/123 |
| EP | 3309972 A1 * | 4/2018 | ............ | H04B 1/123 |
| EP | 2771977 B1 * | 2/2019 | ............ | H04B 1/525 |
| EP | 3309972 B1 * | 7/2019 | ............ | H04B 1/123 |
| EP | 3342051 B1 * | 7/2019 | ............... | H03F 3/19 |
| EP | 3350932 B1 * | 11/2019 | ............ | H04B 1/525 |
| EP | 3125443 B1 * | 2/2020 | ........... | H04B 7/2643 |
| EP | 3944519 A1 * | 1/2022 | ........... | H04B 7/2643 |
| EP | 4152636 A1 * | 3/2023 | ........ | H04B 7/04013 |
| ES | 2799713 T3 * | 12/2020 | ........... | H04B 7/0486 |
| GB | 2502045 A * | 11/2013 | ........... | H04B 1/0475 |
| JP | 2014003684 A * | 1/2014 | ............... | H04B 7/26 |
| JP | 5677861 B2 * | 2/2015 | ............ | H04B 1/525 |
| JP | 5860008 B2 * | 2/2016 | ............... | H04B 7/26 |
| JP | 2016076989 A * | 5/2016 | ............... | H04B 7/26 |
| JP | 6017577 B2 * | 11/2016 | ............ | H04B 1/525 |
| JP | 2017005728 A * | 1/2017 | ............ | H04B 1/525 |
| JP | 6100406 B2 * | 3/2017 | ............... | H04B 1/44 |
| JP | 6226946 B2 * | 11/2017 | ............... | H04B 7/26 |
| JP | 2018029376 A * | 2/2018 | ............... | H04B 7/26 |
| JP | 6377680 B2 * | 8/2018 | ............ | H04B 1/525 |
| JP | 7159317 B2 * | 10/2022 | ............ | H04B 17/318 |
| TW | 200835196 A * | 8/2008 | ............... | H01Q 1/22 |
| TW | 200947891 A * | 11/2009 | ............ | H04B 1/525 |
| WO | WO-0212907 A2 * | 2/2002 | ........ | G01R 29/0821 |
| WO | WO-0243274 A2 * | 5/2002 | ............ | H04W 52/52 |
| WO | WO-2009106515 A1 * | 9/2009 | ............... | H03F 1/02 |
| WO | WO-2009114638 A1 * | 9/2009 | ............ | H04B 1/525 |
| WO | WO-2009116905 A1 * | 9/2009 | ........... | H04B 17/309 |
| WO | WO-2013056261 A1 * | 4/2013 | ........... | H04B 1/0064 |
| WO | WO-2013063506 A2 * | 5/2013 | ............ | H04B 1/525 |
| WO | WO-2013173250 A1 * | 11/2013 | ............ | H04B 1/123 |
| WO | WO-2014104961 A2 * | 7/2014 | ........... | G01S 5/0226 |
| WO | WO-2014133907 A1 * | 9/2014 | ............... | H04B 1/44 |
| WO | WO-2014159271 A1 * | 10/2014 | ........... | H04B 1/0475 |
| WO | WO-2014188234 A1 * | 11/2014 | ........... | H04B 7/0417 |
| WO | WO-2015016575 A1 * | 2/2015 | ............ | H04B 7/024 |
| WO | WO-2016186347 A1 * | 11/2016 | | |
| WO | WO-2017045707 A1 * | 3/2017 | ............ | H04B 1/525 |
| WO | WO-2018125686 A2 * | 7/2018 | ............ | H04W 12/06 |
| WO | WO-2019090019 A1 * | 5/2019 | ............... | H04B 1/38 |
| WO | WO-2019133048 A1 * | 7/2019 | ............ | H04B 17/318 |
| WO | WO-2019190813 A1 * | 10/2019 | ............ | H04B 1/005 |
| WO | WO-2019190825 A1 * | 10/2019 | ............ | H04B 1/005 |
| WO | WO-2020194268 A1 * | 10/2020 | ........... | H04B 17/318 |
| WO | WO-2020222458 A1 * | 11/2020 | ............ | H04B 1/525 |
| WO | WO-2020227482 A1 * | 11/2020 | ........... | H03H 17/00 |
| WO | WO-2021062077 A1 * | 4/2021 | ........... | G01S 1/0428 |
| WO | WO-2021100601 A1 * | 5/2021 | ............ | H04W 16/08 |
| WO | WO-2021108572 A1 * | 6/2021 | ........... | H04B 7/0632 |
| WO | WO-2021131913 A1 * | 7/2021 | ........... | H04B 17/345 |
| WO | WO-2021188283 A1 * | 9/2021 | ............ | H04L 1/0068 |
| WO | WO-2021226824 A1 * | 11/2021 | | |
| WO | WO-2022020263 A1 * | 1/2022 | ........... | H04B 17/345 |
| WO | WO-2022025629 A1 * | 2/2022 | ............ | H04L 5/0053 |
| WO | WO-2022027073 A1 * | 2/2022 | ........... | H04B 7/0486 |
| WO | WO-2022051117 A1 * | 3/2022 | ............ | H04B 7/024 |
| WO | WO-2022051147 A1 * | 3/2022 | ........... | H04B 7/0691 |
| WO | WO-2022060407 A1 * | 3/2022 | | |
| WO | WO-2022187758 A1 * | 9/2022 | ......... | H04L 27/2618 |
| WO | WO-2022205044 | 10/2022 | | |
| WO | WO-2022205044 A1 * | 10/2022 | ............ | H04B 7/088 |
| WO | WO-2023272717 A1 * | 1/2023 | | |

* cited by examiner

TRANSMIT DIVERSITY POWER LEAKAGE DETECTION AND FILTERING IN ANTENNA COMPENSATOR POWER DETECTOR

FIELD OF TECHNOLOGY

The following relates to wireless communications, including transmit diversity power leakage detection and filtering in antenna compensator power detector.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

For a UE that uses transmit diversity schemes, a switch at the UE may alternate which antenna receives power for a transmission. However, some power may leak across the switch to an unintended antenna for a transmission.

SUMMARY

The described techniques relate to improved techniques, devices, and apparatuses that support transmit diversity power leakage detection and filtering in antenna compensator power detector. The described techniques may enable a user equipment (UE) utilizing transmit antenna diversity to filter leaked power so the UE can perform antenna compensation operations (e.g., apply a transmit gain, perform cable loss measurements) using valid power measurements. A switch at the UE may leak power to an unintended antenna for a transmission, and the UE may use a dynamic filtering algorithm to determine whether power associated with a pulse of a detected signal is leaked or valid. The dynamic filtering algorithm may be able to account for variations in leaked power values, as leaked power may increase or decrease proportionally to intended power (e.g., from which power was leaked). By determining whether a measured pulse is leaked or valid, the UE may be able to filter out the leaked power and accurately perform antenna compensation operations such as applying a transmit gain for a transmission, performing a cable loss measurement, or the like.

A method for wireless communication at a UE is described. The method may include measuring a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas, applying a leakage detection function to the set of multiple pulses to filter out the second set of pulses from the first set of pulses, and performing an antenna compensation operation based on applying the leakage detection function.

An apparatus for wireless communication at a UE is described. The apparatus may include a processor, memory coupled with the processor, and instructions stored in the memory. The instructions may be executable by the processor to cause the apparatus to measure a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas, apply a leakage detection function to the set of multiple pulses to filter out the second set of pulses from the first set of pulses, and perform an antenna compensation operation based on applying the leakage detection function.

Another apparatus for wireless communication at a UE is described. The apparatus may include means for measuring a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas, means for applying a leakage detection function to the set of multiple pulses to filter out the second set of pulses from the first set of pulses, and means for performing an antenna compensation operation based on applying the leakage detection function.

A non-transitory computer-readable medium storing code for wireless communication at a UE is described. The code may include instructions executable by a processor to measure a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas, apply a leakage detection function to the set of multiple pulses to filter out the second set of pulses from the first set of pulses, and perform an antenna compensation operation based on applying the leakage detection function.

In some examples of the method, apparatuses, and non-transitory computer-readable medium described herein, performing the antenna compensation operation may include operations, features, means, or instructions for adjusting a transmission gain of at least one antenna of the set of multiple antennas and transmitting signaling using the adjusted transmission gain.

In some examples of the method, apparatuses, and non-transitory computer-readable medium described herein, performing the antenna compensation operation may include operations, features, means, or instructions for calculating a cable loss measurement associated with at least one antenna of the set of multiple antennas based on an averaging of the first set of pulses.

In some examples of the method, apparatuses, and non-transitory computer-readable medium described herein, applying the leakage detection function may include operations, features, means, or instructions for comparing a first power of a current pulse of the set of multiple pulses with an output of the leakage detection function, where the leakage detection function includes a function of a threshold value, the first power of the current pulse, a second power of a previous pulse of the set of multiple pulses, and a delta value and marking the current pulse with either a valid power marker or a leaked power marker based on the comparing.

In some examples of the method, apparatuses, and non-transitory computer-readable medium described herein, the leakage detection function includes a maximum of a first value and a second value, the first value may be the threshold value, the second value may be a sum of the delta value and a maximum of a third value and a fourth value, and the third value may be the first power of the current pulse, and the fourth value may be the second power of the previous pulse.

In some examples of the method, apparatuses, and non-transitory computer-readable medium described herein, the threshold value may be a constant value that represents a minimum valid power for the current pulse.

In some examples of the method, apparatuses, and non-transitory computer-readable medium described herein, the delta value may be a constant value that represents a minimum difference in power between the first power of the current pulse and the second power of the previous pulse for determining that the current pulse may be a leaked pulse.

Some examples of the method, apparatuses, and non-transitory computer-readable medium described herein may further include operations, features, means, or instructions for initializing the first power of the current pulse with the threshold value and initializing the second power of the previous pulse with the threshold value.

Some examples of the method, apparatuses, and non-transitory computer-readable medium described herein may further include operations, features, means, or instructions for setting the second power of the previous pulse to be equal to the first power of the current pulse.

Some examples of the method, apparatuses, and non-transitory computer-readable medium described herein may further include operations, features, means, or instructions for measuring the set of multiple pulses of the signal at a compensator coupled with the second antenna.

In some examples of the method, apparatuses, and non-transitory computer-readable medium described herein, the set of multiple pulses of the signal includes an alternating pattern of valid pulses corresponding to the first set of pulses and leaked pulses corresponding to the second set of pulses.

DETAILED DESCRIPTION

Figure 1:
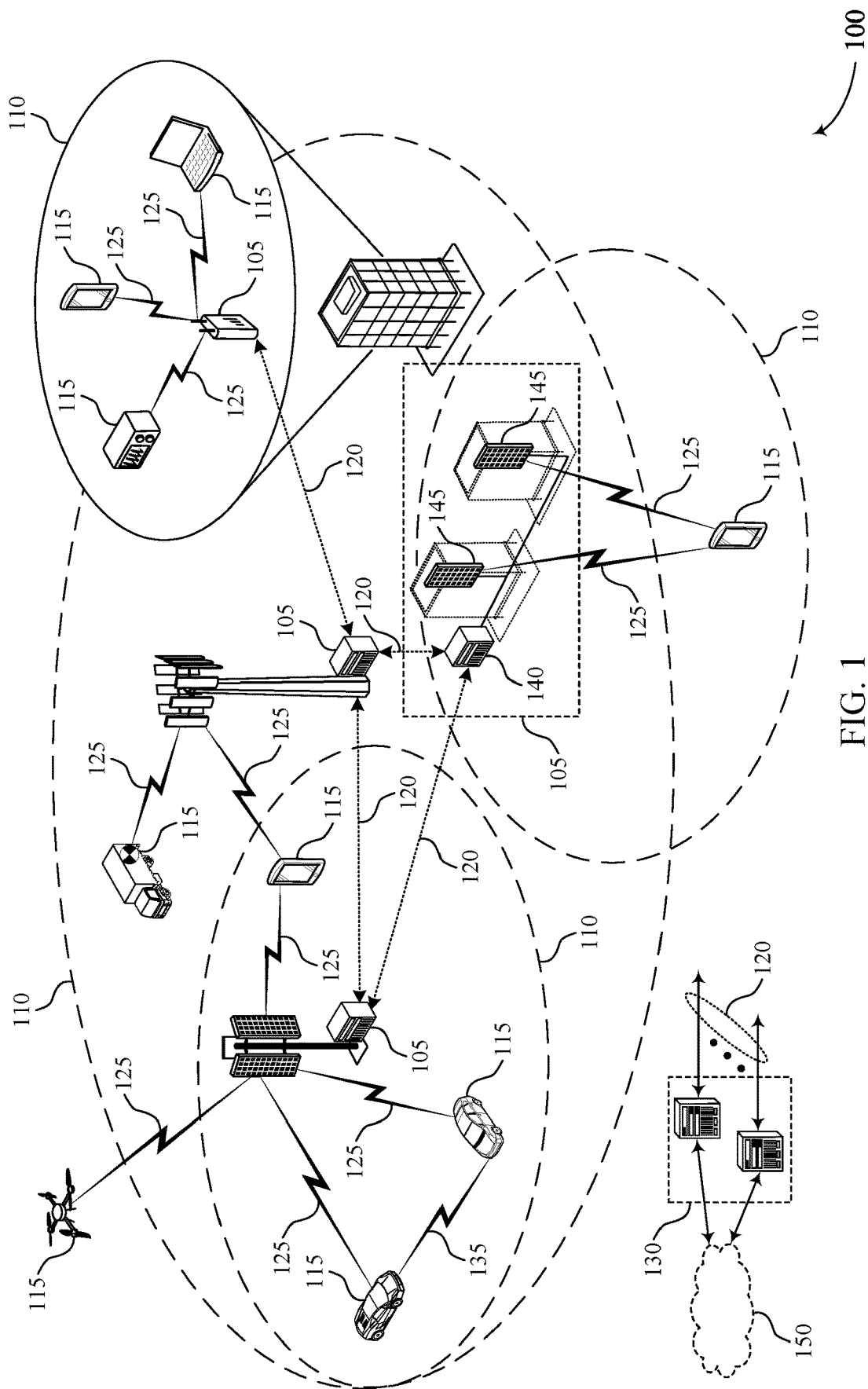
FIG. 1 illustrates an example of a wireless communications system that supports transmit diversity power leakage detection and filtering in antenna compensator power detector in accordance with aspects of the present disclosure.

In some wireless communications systems, a user equipment (UE) (e.g., a vehicle-to-everything (V2X) UE) may include one or more antennas that are located relatively far away (e.g., 3 meters) from the modem or other controlling circuitry. In such cases, there may be losses in the cable that connects the antennas to the modem such that the actual power transmitted by the antenna is less than the intended power output by the modem. To correct for these losses, a cable loss measurement may be performed where a component referred to as an antenna compensator may measure the radio frequency power output from the modem (e.g., from the analog to digital converter (ADC)) and compare that measurement to the actual power that is transmitted by the antenna. Based on this difference, the modem may adjust the output power or gain to compensate for the cable losses such that the actual power transmitted by the antenna matches the intended transmit power.

Some UEs (e.g., V2X UEs among other examples) may also transmit signaling using two or more antennas according to a transmit diversity scheme. In such cases, the UE may transmit using one antenna at a time according to an alternating pattern. As an example, the UE may include a modem, a switch, two antennas, and two cables connecting the switch with a corresponding antenna. The modem may output power intended for a first antenna at an intended power (e.g., an intended radio frequency (RF) power) via a first cable. However, due to imperfections at the switch, some power may leak across the switch and into a second cable, resulting in a transmission from a second antenna. In such cases, the first antenna may transmit signaling according to the intended power (less any cable losses in the first cable), and the second antenna may transmit signaling according to the leaked power.

An antenna compensator may measure the signaling transmitted from the second antenna based on the leaked power and consider the transmission power in a cable loss measurement. However, since this measured power is the result of leaked power from the modem instead of an actual intended transmission, considering the leaked power transmission in a cable loss calculation may lead to inaccuracies in the calculation and subsequent adjustments by the modem. The UE may filter out the leaked power (e.g., and thus not consider the leaked power in the cable loss measurement calculation) by comparing the leaked power to a static threshold. However, because the leaked power in one antenna is proportional to intended power transmitted on the other antenna, a static threshold may be undesirable for filtering out the leaked power.

In accordance with aspects of the present disclosure, a UE or a combination of components within or associated with the UE may use a dynamic filtering algorithm to filter out leaked power across antennas for transmit diversity schemes to accurately perform operations such as cable loss measurement calculations, transmission gain calculations, or the like. For example, a compensator may perform a calculation to determine if measured signaling is from leaked power into an antenna or intended power transmitted through the antenna. The calculation may include evaluating a function that compares a measured power of a current pulse to a measured power of a previously received pulse, and may include other variables such as thresholds, delta values, and the like. If the compensator determines that the power of the current pulse is resulting from leaked power, the compensator or some other component of the UE may not consider the leaked power when performing transmission gain calculations or calculating cable loss measurements. If the compensator determines that the power of the current pulse is valid (e.g., resulting from an intended transmission through an antenna), the UE may include or consider the valid power when performing transmission gain calculations or calculating cable loss measurements.

Aspects of the disclosure are initially described in the context of wireless communications systems. Aspects of the disclosure are further illustrated by and described with reference to a wireless device, a dynamic filtering algorithm, a detected power plot, a process flow, apparatus diagrams, system diagrams, and flowcharts that relate to transmit diversity power leakage detection and filtering in antenna compensator power detector.

FIG. 1 illustrates an example of a wireless communications system 100 that supports transmit diversity power leakage detection and filtering in antenna compensator power detector in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

According to the techniques described herein, a UE 115 may distinguish between pulses associated with leaked power and pulses associated with intended power to accurately perform antenna compensation operations (e.g., apply a transmit gain, perform cable loss measurements). A switch at the UE 115 may leak power to an antenna for a transmission, and the UE 115 may use a dynamic filtering algorithm to determine whether a pulse power of a detected signal is leaked or valid. The dynamic filtering algorithm may be able to account for variations in leaked power values, as leaked power may increase or decrease proportionally to intended power. By determining whether pulse power is leaked or valid, the UE 115 may be able to filter out the leaked power and accurately perform antenna compensation operations such as applying a transmit gain for a transmission, performing a cable loss measurement, or the like.

Figure 2:
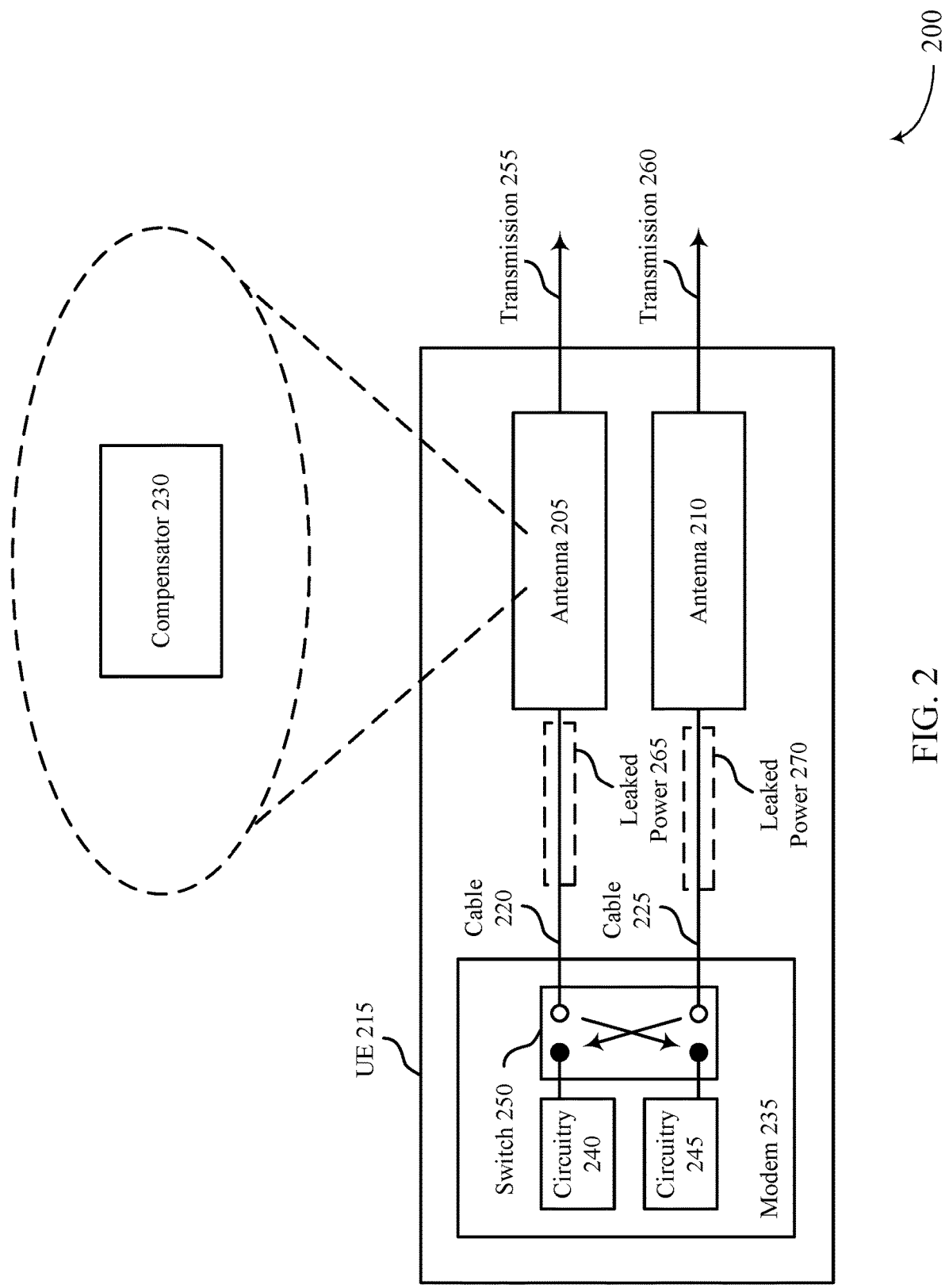
FIG. 2 illustrates an example of a wireless device that supports transmit diversity power leakage detection and filtering in antenna compensator power detector in accordance with aspects of the present disclosure.

FIG. 2 illustrates an example of a wireless device 200 that supports transmit diversity power leakage detection and filtering in antenna compensator power detector in accordance with aspects of the present disclosure. The wireless device 200 may implement or be implemented by aspects of the wireless communications system 100 as described with reference to FIG. 1. For example, the wireless device 200 may include UE 215, which may be an example of a UE 115, or any other device, as described herein. The wireless device 200 may support improvements to interference, processing, power consumption, and more efficient utilization of communication resources, among other benefits.

In some wireless communications systems, UE 215 may transmit signaling using one or more antennas according to a transmit diversity scheme. For example, UE 215 may transmit a same data (e.g., repetitions of a data stream or data packets) using multiple antennas. In some transmit diversity schemes, UE 215 may transmit signaling using one antenna at a time, which may be referred to as an alternating transmit diversity scheme. For example, UE 215 may transmit using antenna 205 at a first time and may transmit using antenna 210 at a second time. Transmitting according to the transmit diversity scheme may result in one or more benefits, such as increased redundancy in communications, decreased fading effects, increased signal-to-noise ratio (SNR), among other benefits.

In some cases, UE 215 may be a V2X UE, or any other type of UE, and may include various components at various locations on UE 215, and UE 215 may not be limited to the illustrations or nomenclature provided by wireless device 200. For example, UE 215 may include one or more antennas (e.g., two, three, four, five, or more antennas), and UE 215 may not be limited by the two example antennas (e.g., antenna 205 and antenna 210) as illustrated. In some examples, antenna 205 and antenna 210 may be located a same distance away relative to the front or back of UE 215, or may be located different distances away relative to the front or back of the UE 215. In some cases, cable 220 and cable 225 may be the same length (e.g., regardless of the locations of antenna 205 and antenna 210), or in some other cases, cable 220 and cable 225 may be different lengths. Antenna 205 may include compensator 230, and antenna 210 may additionally or alternatively include a compensator device. In some cases, compensator 230 may be referred to as or may include an active antenna. In some cases, modem 235 may be referred to as or may include a radio (e.g., a cellular V2X (CV2X) radio).

UE 215 may use circuitry 240, circuitry 245, or both, to generate signaling for transmission. In some cases, circuitry 240, circuitry 245, or both, may communicate with one or more devices on UE 215, outside of UE 215, or both. Circuitry 240, circuitry 245, or both, may transmit signaling to switch 250 (e.g., via wires, cables). Switch 250 may control which of cable 220 or cable 225 receives power and may supply power to the cable 220 and cable 225 in an alternating pattern according to an alternating transmit diversity scheme. For example, at a first time, the modem 235 and switch 250 may supply cable 220 with a first power for transmitting signaling on antenna 205. However, due to losses in the cable 220 (e.g., as a result of cable length, power leakage, or the like), the antenna 205 may transmit at a power that is less than the intended power supplied by the modem 235. The compensator 230 may be configured to determine a difference between the supplied power at the modem 235 and the measured power output from the antenna 205 (e.g., perform a cable loss measurement) to adjust a transmission gain or otherwise compensate for the cable losses.

In some cases, switch 250 may leak power to an unintended cable due to imperfections at the switch 250. For example, if switch 250 supplies power to cable 225 for a transmission from antenna 210, some power may leak to cable 220. The leaked power 265 received by cable 220 may be less than the intended power received by cable 225. Similarly, if switch 250 supplies power to cable 220, the switch 250 may leak leaked power 270 to cable 225.

If the compensator 230 measures a signal resulting from a leaked power (e.g., leaked power 265 or leaked power 270) and uses that measured signal in a cable loss calculation, the calculation may improperly represent the actual cable loss thereby causing inaccurate calculations and inaccurate adjustments at the modem 235.

Furthermore, the UE 215 may not include a mechanism for modem 235 to indicate to antenna 205 or antenna 210 that signaling along cable 220 or cable 225 is leaked. For example, UE 215 may not include software or circuitry, such as a general-purpose input/output (GPIO), to indicate to antenna 205 or antenna 210 that a received power is leaked. Thus, techniques to enable compensator 230, antenna 205, or antenna 210 to determine whether received power is leaked or valid may be desirable.

According to the techniques described herein, UE 215 (e.g., at antenna 205, antenna 210, compensator 230, modem 235, or a combination of components) may use a dynamic filtering algorithm to filter out leaked power to accurately perform operations such as cable loss measurement calculations, transmission gain calculations, or the like. For example, compensator 230 may perform a calculation to determine if measured signaling associated with a power is leaked power or intended power. The calculation may include evaluating a function that compares a current power of a current pulse of a signal to a previous power of a previous pulse of the signal, and may include other variables such as thresholds, delta values, and the like. If compensator 230 determines that the power of the current pulse is leaked, UE 215 may not consider (e.g., may filter out) the leaked power when performing transmission gain calculations or calculating cable loss measurements. If compensator 230 determines that the power of the current pulse is valid (e.g., intended), UE 215 may include or consider the valid power when performing transmission gain calculations or calculating cable loss measurements.

The dynamic filtering algorithm may include a comparison between a first power of a current pulse of a signal with an output of a leakage detection function. The leakage detection function may output a maximum of a first value and a second value, where the first value is a threshold value (e.g., a constant threshold value), and where the second value is a sum of a delta value (e.g., a constant delta value) and a maximum of a third value and a fourth value, where the third value is the first power of the current pulse, and the fourth value is a second power of the previous pulse. The dynamic filtering algorithm is described with further detail with reference to FIG. 3.

Figure 3:
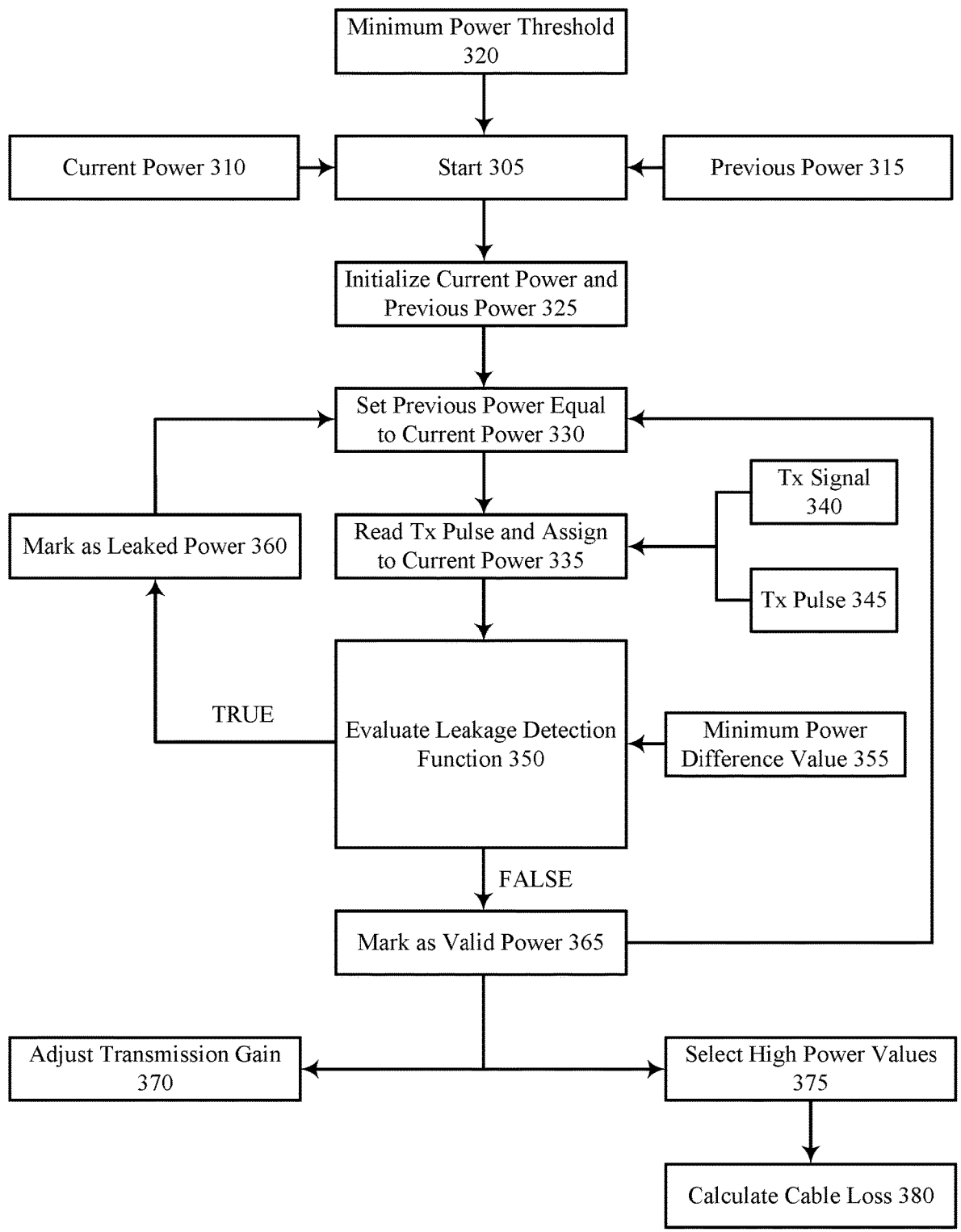
FIG. 3 illustrates an example of a dynamic filtering algorithm that supports transmit diversity power leakage detection and filtering in antenna compensator power detector in accordance with aspects of the present disclosure.

FIG. 3 illustrates an example of a dynamic filtering algorithm 300 that supports transmit diversity power leakage detection and filtering in antenna compensator power detector in accordance with aspects of the present disclosure. The dynamic filtering algorithm 300 may implement or be implemented by aspects of the wireless communications system 100, wireless device 200, or both, as described with reference to FIGS. 1 and 2. For example, the dynamic filtering algorithm 300 may illustrate a dynamic filtering algorithm at a UE, or any other device, which may be examples of corresponding devices described with reference to FIGS. 1 and 2.

Generally, a UE (e.g., at an antenna, or at a compensator at the antenna) may read a detected or received transmission (Tx) pulse, which may be referred to as a current pulse, associated with a power (e.g., in decibels (dB)), which may be referred to as a current power, and may use dynamic filtering algorithm 300 to evaluate whether the current power associated with the current pulse is leaked or valid. If the current power is leaked, the UE may filter out the leaked power and may perform an antenna compensation operation without considering the leaked power, or may not perform an antenna compensation operation. If the current power is valid, the UE may perform an antenna compensation operation using the valid power. The antenna compensation operation may include adjusting a transmission gain, calculating cable losses, or both.

At the start 305 of the dynamic filtering algorithm 300, the UE may identify a current power 310 (e.g., associated with a power being measured at the current instant), a previous power 315 (e.g., associated with a power measured previously), and a minimum power threshold 320. The current power 310 and previous power 315 may be associated with a current and previous pulse of a signal, respectively. The minimum power threshold 320 may represent a minimum valid power for the current pulse and may be a configurable parameter.

At 325, the UE may initialize the current power 310 and the previous power 315. For example, the UE may set the current power 310 equal to the minimum power threshold 320, and may set the previous power 315 equal to the minimum power threshold 320.

At 330, the UE may set the previous power 315 equal to the current power 310.

At 335, the UE may receive Tx signal 340, which may include Tx pulse 345, and may measure a power of Tx pulse 345 and assign the power of Tx pulse 345 to the current power 310.

At 350, the UE may evaluate a leakage detection function. The leakage detection function may include current power 310 (e.g., measured from Tx pulse 345), previous power 315 (e.g., set equal to the current power before the UE measured Tx pulse 345 at 335), minimum power threshold 320 (e.g., a constant value), and minimum power difference value 355 (e.g., a constant value). In some cases, such power values may be in dB. The minimum power difference value 355 may represent a minimum difference in power between the current power 310 of the Tx pulse 345 (e.g., current pulse), and the previous power 315 of a previous pulse for determining that Tx pulse 345 is a leaked pulse (e.g., that current power 310 is leaked). Generally, the leakage detection function may compare current power 310 to a non-static threshold that accounts for variable (e.g., non-static) leaked power values (e.g., due to the proportionality to intended power). In some examples, the leakage detection function may be defined as:

$$\text{cur\_pdet\_db} < \max(\text{PDET\_THRESH\_DB}, \max(\text{cur\_pdet\_db}, \text{prev\_pdet\_db}) + \text{PDET\_DELTA\_DB}) \quad (1)$$

where cur_pdet_db may be referred to as current power 310, prev_pdet_db may be referred to as previous power 315, PDET_THRESH_DB may be referred to as minimum power threshold 320, and PDET_DELTA_DB may be referred to as minimum power difference value 355 (e.g., a delta value).

If the leakage detection function evaluates as true (e.g., that is, the current power 310 is less than the non-static threshold on the right-hand side of the comparison), then at 360, the UE may indicate that current power 310, corresponding to Tx pulse 345, is leaked power. The UE may evaluate the next Tx pulse 345 in the Tx signal 340. That is, the UE may set the previous power 315 equal to the current power 310 at 330, measure Tx pulse 345 (e.g., a next Tx pulse) and assign Tx pulse 345 to current power 310 at 335, and evaluate the leakage detection function at 350 for Tx pulse 345.

If the leakage detection function evaluates as false (e.g., that is, the current power 310 is greater than the non-static threshold on the right-hand side of the comparison), then at 365, the UE may indicate that the current power 310, corresponding to Tx pulse 345, is valid power. The UE may then perform an antenna compensation operation. For example, at 370, the UE may adjust a transmission gain for a transmission using the valid power. Additionally or alternatively, at 375, after the UE has accumulated N number of valid power values, the UE may select a number of past high power values of the N valid power values (e.g., the N/2 highest power values), and perform an averaging calculation using the selected high power values for calculating a cable loss at 380.

A number of example iterations or parts of iterations of dynamic filtering algorithm 300 may be described.

In some examples, a modem at a UE may transmit 5 packets with a power level of 19.8 dB. A power detector on a compensator on a first antenna may detect 10 pulses, with 5 of them being real or intended transmitted power, and the other 5 of them may be leaked power from a second antenna for re-transmission. The following table may show detected power for such pulses at 10 different times (e.g., T0, T1, T2, T3, T4, T5, T6, T7, T8, and T9), where Pdet may refer to the detected power:

| Pdet0 | Pdet1 | Pdet2 | Pdet3 | Pdet4 | Pdet5 | Pdet6 | Pdet7 | Pdet8 | Pdet9 |
|---|---|---|---|---|---|---|---|---|---|
| 18.9 | 6.2 | 19.8 | 6.1 | 19.7 | 6.2 | 19.8 | 6.2 | 19.4 | 6.1 |

Each value may be represented in dB. The UE may use dynamic filtering algorithm 300 to determine that detected power levels of around 6 dB (e.g., corresponding to power detected at Pdet1, Pdet3, Pdet5, Pdet7, and Pdet 9) may be leaked power, and may be filtered (e.g., discarded). At step 325 of dynamic filtering algorithm 300, the UE may initialize current power 310 to be equal to the minimum power threshold 320 (e.g., if PDET_THRESH_DB=−16, then cur_pdet_db=−16). The UE may initialize previous power 315 to be equal to the minimum power threshold 320 (e.g., if PDET_THRESH_DB=−16, then prev_pdet_db=−16).

At time T0 (e.g., at 335), the UE may read the first power level (e.g., Pdet0) (e.g., from Tx pulse 345) and assign the first power level to cur_pdet_db (e.g., cur_pdet_db=18.9). The UE may evaluate the leakage detection function at 350. Using PDET_DELTA_DB=−3 (e.g., in dB), and evaluating the right-hand side of the function first (e.g., max (PDET_THRESH_DB, max (cur_pdet_db, prev_pdet_db)+PDET_DELTA_DB), the UE may evaluate max(−16, max (18.9, −16)−3)=15.9. The UE may evaluate the rest of the leakage detection function cur_pdet_db<15.9. As cur_pdet_db=18.9, and 18.9 is not less than 15.9, the function may return false, and thus the UE may determine that cur_pdet_db is valid power (e.g., at 365).

At time T1 (e.g., at 330, from 365), the UE may assign cur_pdet_db to prev_pdet_db. That is, prev_pdet_db=cur_pdet_db, and thus prev_pdet_db=15.9. The UE may read a second power level (e.g., Pdet1) (e.g., from Tx pulse 345) and assign the second power level to cur_pdet_db (e.g., cur_pdet_db=6.2). The UE may evaluate the leakage detection function at 350. Using PDET_DELTA_DB=−3 (e.g., in dB), and evaluating the right-hand side of the function first (e.g., max (PDET_THRESH_DB, max (cur_pdet_db, prev_pdet_db)+PDET_DELTA_DB), the UE may evaluate max(−16, max(6.2, 15.9)−3)=12.9. The UE may evaluate the rest of the leakage detection function cur_pdet_db<12.9. As cur_pdet_db=6.2, and 6.2 is less than 12.9, the function may return true, and thus the UE may determine that cur_pdet_db is leaked power (e.g., at 360).

At time T2 (e.g., at 330, from 360), the UE may assign cur_pdet_db to prev_pdet_db. That is, prev_pdet_db=cur_pdet_db, and thus prev_pdet_db=6.2. The UE may read a third power level (e.g., Pdet2) (e.g., from Tx pulse 345) and assign the third power level to cur_pdet_db (e.g., cur_pdet_db=19.8). The UE may evaluate the leakage detection function at 350. Using PDET_DELTA_DB=−3 (e.g., in dB), and evaluating the right-hand side of the function first (e.g., max (PDET_THRESH_DB, max (cur_pdet_db, prev_pdet_db)+PDET_DELTA_DB), the UE may evaluate max(−16, max(19.8, 6.2)−3)=16.8. The UE may evaluate the rest of the leakage detection function cur_pdet_db<16.8. As cur_pdet_db=19.8, and 19.8 is not less than 16.8, the function may return false, and thus the UE may determine that cur_pdet_db is valid power (e.g., at 365).

In some other examples, the power detector may detect 10 pulses where there may be a sudden power level change, down from 19.8 dB to about 8 dB at time T2. The following table may show detected power for such pulses at 10 different times (e.g., T0, T1, T2, T3, T4, T5, T6, T7, T8, and T9), where Pdet may refer to the detected power:

| Pdet0 | Pdet1 | Pdet2 | Pdet3 | Pdet4 | Pdet5 | Pdet6 | Pdet7 | Pdet8 | Pdet9 |
|---|---|---|---|---|---|---|---|---|---|
| 18.9 | 6.2 | 8.2 | −5.9 | 8.5 | −5.9 | 8.6 | −5.9 | 8.9 | −5.9 |

Each value may be represented in dB. The UE may use dynamic filtering algorithm 300 to determine that detected power level of Pdet0 may be valid power, and Pdet1 may be leaked power.

At time T2 (e.g., at 330, from 360), the UE may assign cur_pdet_db to prev_pdet_db. That is, prev_pdet_db=cur_pdet_db, and thus prev_pdet_db=6.2. The UE may read a third power level (e.g., Pdet2) (e.g., from Tx pulse 345) and assign the third power level to cur_pdet_db (e.g., cur_pdet_db=8.2). The UE may evaluate the leakage detection function at 350. Using PDET_DELTA_DB=−3 (e.g., in dB), and evaluating the right-hand side of the function first (e.g., max (PDET_THRESH_DB, max (cur_pdet_db, prev_pdet_db)+PDET_DELTA_DB), the UE may evaluate max(−16, max(8.2, 6.2)−3)=5.2. The UE may evaluate the rest of the leakage detection function cur_pdet_db<5.2. As cur_pdet_db=8.2, and 8.2 is not less than 5.2, the function may return false, and thus the UE may determine that cur_pdet_db is valid power (e.g., at 365).

At time T3 (e.g., at 330, from 365), the UE may assign cur_pdet_db to prev_pdet_db. That is, prev_pdet_db=cur_pdet_db, and thus prev_pdet_db=8.2. The UE may read a fourth power level (e.g., Pdet3) (e.g., from Tx pulse 345) and assign the fourth power level to cur_pdet_db (e.g., cur_pdet_db=−5.9). The UE may evaluate the leakage detection function at 350. Using PDET_DELTA_DB=−3 (e.g., in dB), and evaluating the right-hand side of the function first (e.g., max (PDET_THRESH_DB, max (cur_pdet_db, prev_pdet_db)+PDET_DELTA_DB), the UE may evaluate max(−16, max(−5.9, 8.2)−3)=5.2. The UE may evaluate the rest of the leakage detection function cur_pdet_db<5.2. As cur_pdet_db=−5.9, and −5.9 is less than 5.2, the function may return true, and thus the UE may determine that cur_pdet_db is leaked power (e.g., at 360).

Figure 4:
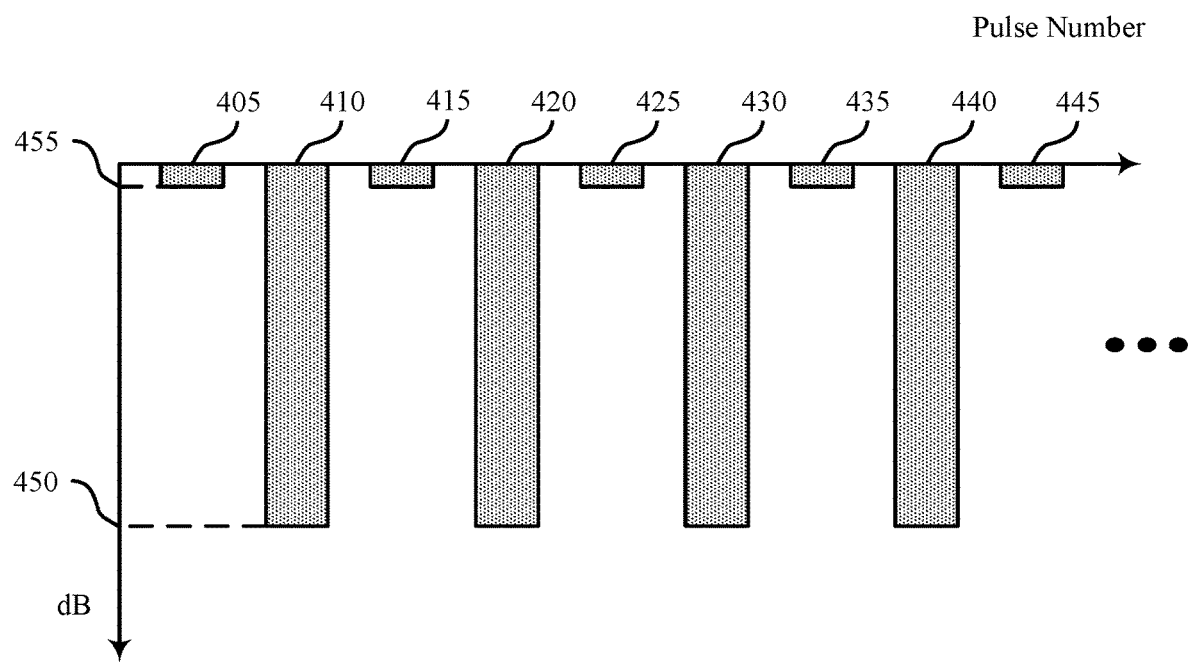
FIG. 4 illustrates an example of a detected power plot that supports transmit diversity power leakage detection and filtering in antenna compensator power detector in accordance with aspects of the present disclosure.

FIG. 4 illustrates an example of a detected power plot 400 that supports transmit diversity power leakage detection and filtering in antenna compensator power detector in accordance with aspects of the present disclosure. The detected power plot 400 may implement or be implemented by aspects of the wireless communications system 100, wireless device 200, or both, as described with reference to FIGS. 1 and 2. For example, detected power plot 400 may illustrate detected power at a UE, or any other device, which may be examples of corresponding devices described with reference to FIGS. 1 and 2.

In some cases, a UE may measure or detect one or more pulses of a signal (e.g., in a discrete manner), which may be associated with a pattern, and the UE may evaluate a power associated with each pulse to determine whether the power of the pulse is leaked or valid. For example, the UE may read or detect pulse 405 first, pulse 410 next, and so on. An amount of time between each pulse may be any amount of time (e.g., 1 millisecond (ms), 100 ms). In some examples, such pulses may be arranged according to an alternating pattern. For example, pulse 405, pulse 415, pulse 425, pulse 435, and pulse 445 may be associated with valid power, and subsequent pulse 410, pulse 420, pulse 430, and pulse 440, respectively, may be associated with leaked power, which may be an example of a valid-leaked-valid-leaked alternating pattern. In some other examples, the alternating pattern may include a valid-valid-leaked-leaked alternating pattern, or any other pattern. In some cases, the UE may use a pattern to determine a threshold (e.g., the right-hand side of the comparison for the leakage detection function, the minimum power threshold, the delta value, or any other threshold), and in some cases the UE may no longer rely on the pattern to hold (e.g., for the UE to detect pulses according to the pattern) for the UE to be able to perform a dynamic filtering algorithm. In cases where the UE may include more than two antennas, the pattern may be a different pattern (e.g., a different alternating pattern). In some cases, each pulse may be associated with a packet for a data transmission.

In some cases, leaked pulse power (e.g., at 450) may have much a significantly lower value than valid pulse power (e.g., at 455), or leaked and valid pulse powers may be closer in value. For example, at 450, the leaked pulse power may be about −700 dB, and the valid pulse power may be about −10 dB. In some other examples, the leaked pulse power may be about 5 dB, and the valid pulse power may be about 20 dB.

In some examples, a minimum power threshold (e.g., PDET_THRESH_DB) for a dynamic filtering algorithm may represent a minimum valid power for a pulse. For example, if pulse 405, pulse 415, pulse 425, pulse 435, and pulse 445 are valid pulse powers, and pulse 410, pulse 420, pulse 430, and pulse 440 are leaked pulse powers, then the minimum power threshold may be between 450 and 455.

In some examples, a minimum power difference value (e.g., a delta value) (e.g., PDET_DELTA_DB) for the dynamic filtering algorithm may represent a minimum difference in power between a current pulse (e.g., pulse 410) and a previous pulse (e.g., pulse 405) for determining that pulse 410 is a leaked pulse. For example, if the power of pulse 405 is −5 dB, the power of pulse 410 is −8 dB, and the minimum power difference value is −5 dB, the UE may not consider the power of pulse 410 to be leaked power due to the power of pulse 410 (e.g., −8 dB) being within 5 dB (e.g., only 3 dB lower) of the power of pulse 405 (e.g., which may be −5 dB). However, if the power of pulse 405 is −5 dB, the power of pulse 410 is −15 dB, and the minimum power difference value is −5 dB, the UE may consider the power of pulse 410 to be leaked power due to the −15 dB power of pulse 410 being lower than the delta value (e.g., −5 dB) plus the power of pulse 405 (e.g., −5 dB).

Figure 5:
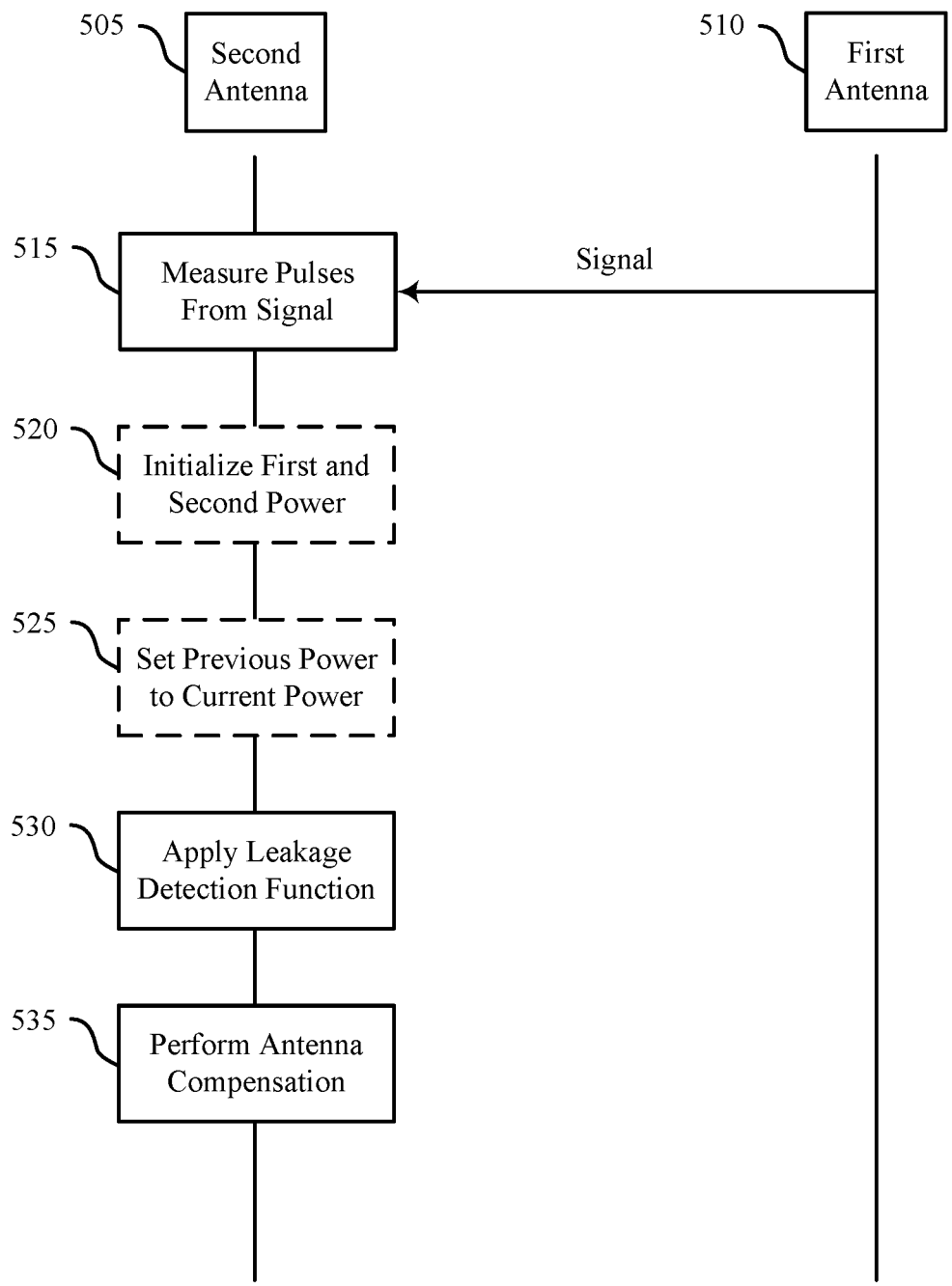
FIG. 5 illustrates an example of a process flow that supports transmit diversity power leakage detection and filtering in antenna compensator power detector in accordance with aspects of the present disclosure.

FIG. 5 illustrates an example of a process flow 500 that supports transmit diversity power leakage detection and filtering in antenna compensator power detector in accordance with aspects of the present disclosure. The process flow 500 may implement or be implemented by aspects of the wireless communications system 100, wireless device 200, dynamic filtering algorithm 300, detected power plot 400, or a combination of these, as described with reference to FIGS. 1, 2, 3, and 4. In some examples, the process flow 500 may include example operations associated with second antenna 505 on a UE and first antenna 510 on the UE, which may be an example of corresponding devices described with reference to FIGS. 1 and 2. In the following description of the process flow 500, the operations between the first antenna 510 and second antenna 505 may be performed in a different order than the example order shown, or the operations performed by the first antenna 510 and second antenna 505 may be performed in different orders or at different times. Some operations may also be omitted from the process flow 500, and other operations may be added to the process flow 500. In some examples, second antenna 505, first antenna 510, or both, may include a compensator.

At 515, second antenna 505 may measure a plurality of pulses of a signal (e.g., detected from signaling transmitted by first antenna 510), where the plurality of pulses may include a first set of pulses resulting from transmissions of first antenna 510 of a plurality of antennas of the UE (e.g., which may include second antenna 505) operating in a transmit diversity mode and a second set of pulses resulting from power leakage into first antenna 510 from second antenna 505 of the plurality of antennas. In some examples, second antenna 505 may measure the plurality of pulses of the signal at a compensator coupled with second antenna 505. In some examples, the plurality of pulses of the signal may include an alternating pattern of valid pulses corresponding to the first set of pulses and leaked pulses corresponding to the second set of pulses.

At 520, second antenna 505 (or the first antenna 510, or one or more compensators, or a modem, or any combination thereof) may initialize a first power of a current pulse with a threshold value. Second antenna 505 (or the first antenna 510, or one or more compensators, or a modem, or any combination thereof) may initialize a second power of a previous pulse with the threshold value.

At 525, second antenna 505 (or the first antenna 510, or one or more compensators, or a modem, or any combination thereof) may set the second power of the previous pulse to be equal to the first power of the current pulse.

At 530, second antenna 505 (or the first antenna 510, or one or more compensators, or a modem, or any combination thereof) may apply a leakage detection function to the plurality of pulses to filter out the second set of pulses from the first set of pulses. In some examples, second antenna 505 (or the first antenna 510, or one or more compensators, or a modem, or any combination thereof) may compare the first power of the current pulse of the plurality of pulses with an output of the leakage detection function, where the leakage detection function may include a function of the threshold value, the first power of the current pulse, the second power of the previous pulse of the plurality of pulses, and a delta value. In some examples, the threshold value may be a constant value that represents a minimum valid power for the current pulse. In some examples, the delta value may be a constant value that represents a minimum difference in power between the first power of the current pulse and the second power of the previous pulse for determining that the current pulse is a leaked pulse. In some examples, the leakage detection function may include a maximum of a first value and a second value, where the first value may be the threshold value, and where the second value may be a sum of the delta value and a maximum of a third value and a fourth value, where the third value may be the first power of the current pulse, and the fourth value may be the second power of the previous pulse.

In some examples, second antenna 505 may mark the current pulse with either a valid power marker or a leaked power marker based on the comparing.

At 535, second antenna 505 (or the first antenna 510, or one or more compensators, or a modem, or any combination thereof) may perform an antenna compensation operation based on applying the leakage detection function. For example, the second antenna 505 (or the first antenna 510, or one or more compensators, or a modem, or any combination thereof) may adjust a transmission gain of at least one antenna of the plurality of antennas, and may transmit signaling using the adjusted transmission gain. In some other examples, the second antenna 505 (or the first antenna 510, or one or more compensators, or a modem, or any combination thereof) may calculate a cable loss measurement associated with at least one antenna of the plurality of antennas based on an averaging of the first set of pulses (e.g., averaging the N/2 highest power values of the first set of pulses).

Figure 6:
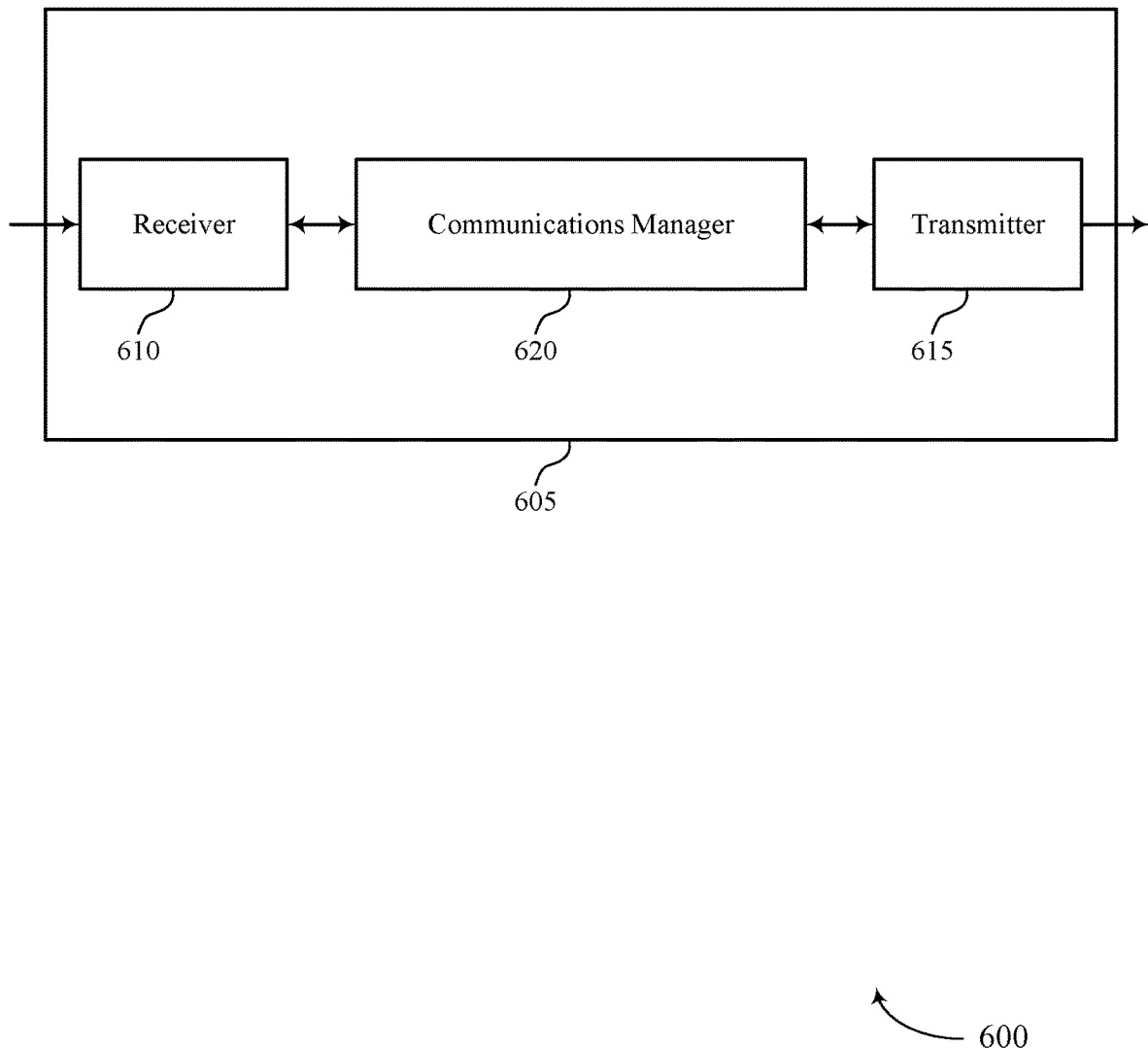
FIGS. 6 and 7 show block diagrams of devices that support transmit diversity power leakage detection and filtering in antenna compensator power detector in accordance with aspects of the present disclosure.

FIG. 6 shows a block diagram 600 of a device 605 that supports transmit diversity power leakage detection and filtering in antenna compensator power detector in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to transmit diversity power leakage detection and filtering in antenna compensator power detector). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to transmit diversity power leakage detection and filtering in antenna compensator power detector). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of transmit diversity power leakage detection and filtering in antenna compensator power detector as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for measuring a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas. The communications manager 620 may be configured as or otherwise support a means for applying a leakage detection function to the set of multiple pulses to filter out the second set of pulses from the first set of pulses. The communications manager 620 may be configured as or otherwise support a means for performing an antenna compensation operation based on applying the leakage detection function.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and more efficient utilization of communication resources.

Figure 7:
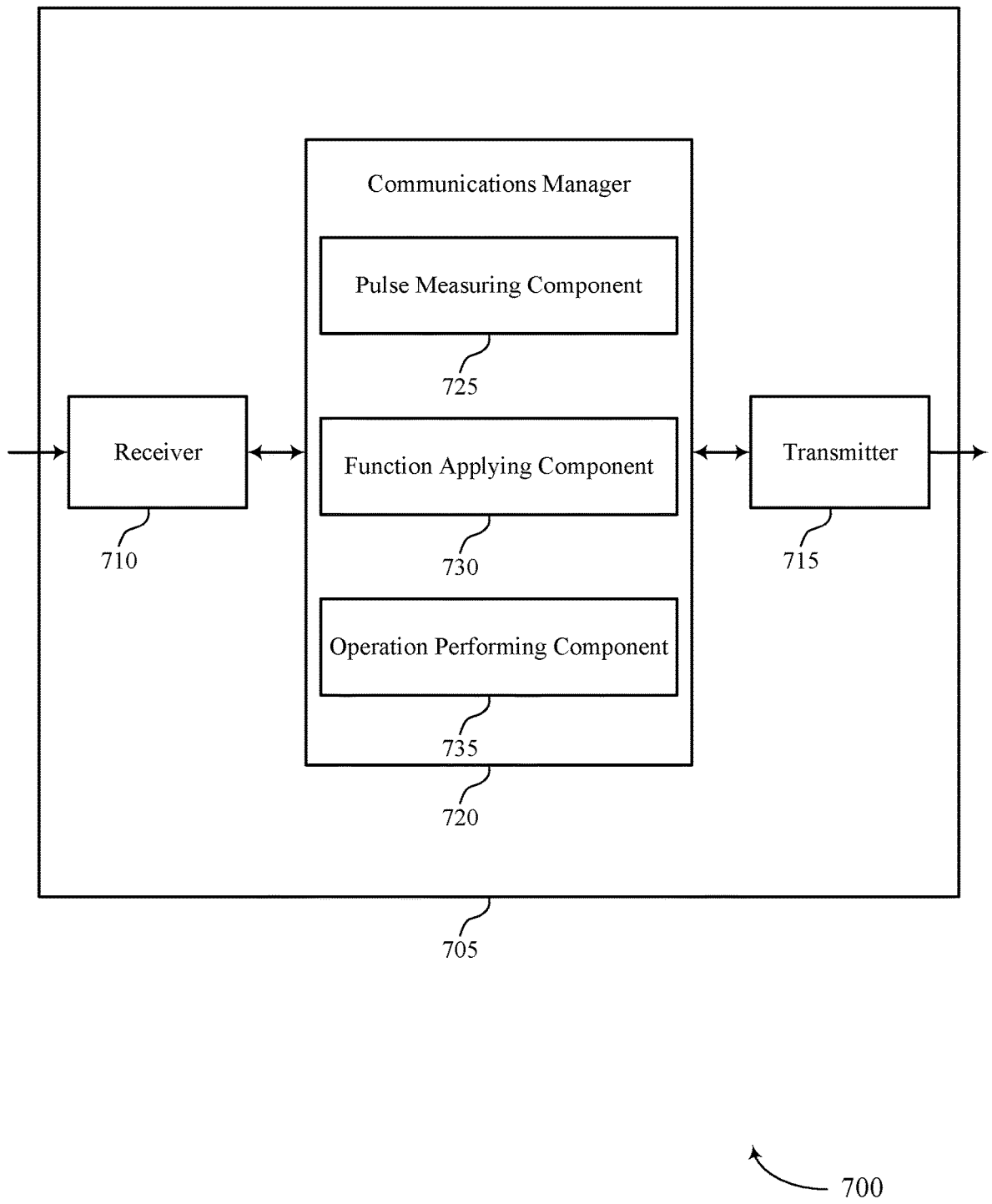

FIG. 7 shows a block diagram 700 of a device 705 that supports transmit diversity power leakage detection and filtering in antenna compensator power detector in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to transmit diversity power leakage detection and filtering in antenna compensator power detector). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to transmit diversity power leakage detection and filtering in antenna compensator power detector). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of transmit diversity power leakage detection and filtering in antenna compensator power detector as described herein. For example, the communications manager 720 may include a pulse measuring component 725, a function applying component 730, an operation performing component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The pulse measuring component 725 may be configured as or otherwise support a means for measuring a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas. The function applying component 730 may be configured as or otherwise support a means for applying a leakage detection function to the set of multiple pulses to filter out the second set of pulses from the first set of pulses. The operation performing component 735 may be configured as or otherwise support a means for performing an antenna compensation operation based on applying the leakage detection function.

Figure 8:
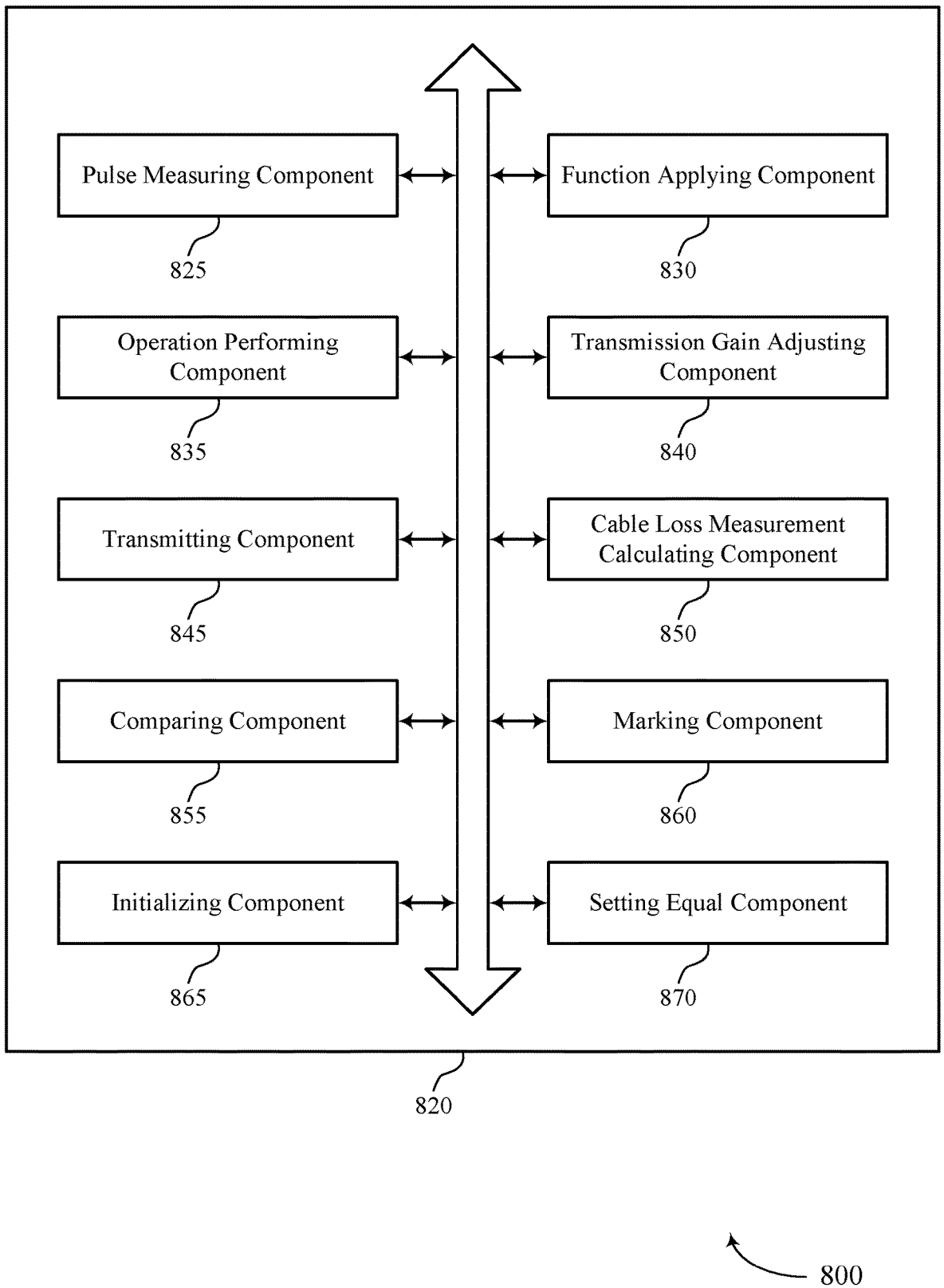
FIG. 8 shows a block diagram of a communications manager that supports transmit diversity power leakage detection and filtering in antenna compensator power detector in accordance with aspects of the present disclosure.

FIG. 8 shows a block diagram 800 of a communications manager 820 that supports transmit diversity power leakage detection and filtering in antenna compensator power detector in accordance with aspects of the present disclosure. The communications manager 820 may be an example of aspects of a communications manager 620, a communications manager 720, or both, as described herein. The communications manager 820, or various components thereof, may be an example of means for performing various aspects of transmit diversity power leakage detection and filtering in antenna compensator power detector as described herein. For example, the communications manager 820 may include a pulse measuring component 825, a function applying component 830, an operation performing component 835, a transmission gain adjusting component 840, a transmitting component 845, a cable loss measurement calculating component 850, a comparing component 855, a marking component 860, an initializing component 865, a setting equal component 870, or any combination thereof. Each of these components may communicate, directly or indirectly, with one another (e.g., via one or more buses).

The communications manager 820 may support wireless communication at a UE in accordance with examples as disclosed herein. The pulse measuring component 825 may be configured as or otherwise support a means for measuring a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas. The function applying component 830 may be configured as or otherwise support a means for applying a leakage detection function to the set of multiple pulses to filter out the second set of pulses from the first set of pulses. The operation performing component 835 may be configured as or otherwise support a means for performing an antenna compensation operation based on applying the leakage detection function.

In some examples, to support performing the antenna compensation operation, the transmission gain adjusting component 840 may be configured as or otherwise support a means for adjusting a transmission gain of at least one antenna of the set of multiple antennas. In some examples, to support performing the antenna compensation operation, the transmitting component 845 may be configured as or otherwise support a means for transmitting signaling using the adjusted transmission gain.

In some examples, to support performing the antenna compensation operation, the cable loss measurement calculating component 850 may be configured as or otherwise support a means for calculating a cable loss measurement associated with at least one antenna of the set of multiple antennas based on an averaging of the first set of pulses.

In some examples, to support applying the leakage detection function, the comparing component 855 may be configured as or otherwise support a means for comparing a first power of a current pulse of the set of multiple pulses with an output of the leakage detection function, where the leakage detection function includes a function of a threshold value, the first power of the current pulse, a second power of a previous pulse of the set of multiple pulses, and a delta value. In some examples, to support applying the leakage detection function, the marking component 860 may be configured as or otherwise support a means for marking the current pulse with either a valid power marker or a leaked power marker based on the comparing.

In some examples, the leakage detection function includes a maximum of a first value and a second value. In some examples, the first value is the threshold value. In some examples, the second value is a sum of the delta value and a maximum of a third value and a fourth value. In some examples, the third value is the first power of the current pulse, and the fourth value is the second power of the previous pulse.

In some examples, the threshold value is a constant value that represents a minimum valid power for the current pulse.

In some examples, the delta value is a constant value that represents a minimum difference in power between the first power of the current pulse and the second power of the previous pulse for determining that the current pulse is a leaked pulse.

In some examples, the initializing component 865 may be configured as or otherwise support a means for initializing the first power of the current pulse with the threshold value. In some examples, the initializing component 865 may be configured as or otherwise support a means for initializing the second power of the previous pulse with the threshold value.

In some examples, the setting equal component 870 may be configured as or otherwise support a means for setting the second power of the previous pulse to be equal to the first power of the current pulse.

In some examples, the pulse measuring component 825 may be configured as or otherwise support a means for measuring the set of multiple pulses of the signal at a compensator coupled with the second antenna.

In some examples, the set of multiple pulses of the signal includes an alternating pattern of valid pulses corresponding to the first set of pulses and leaked pulses corresponding to the second set of pulses.

Figure 9:
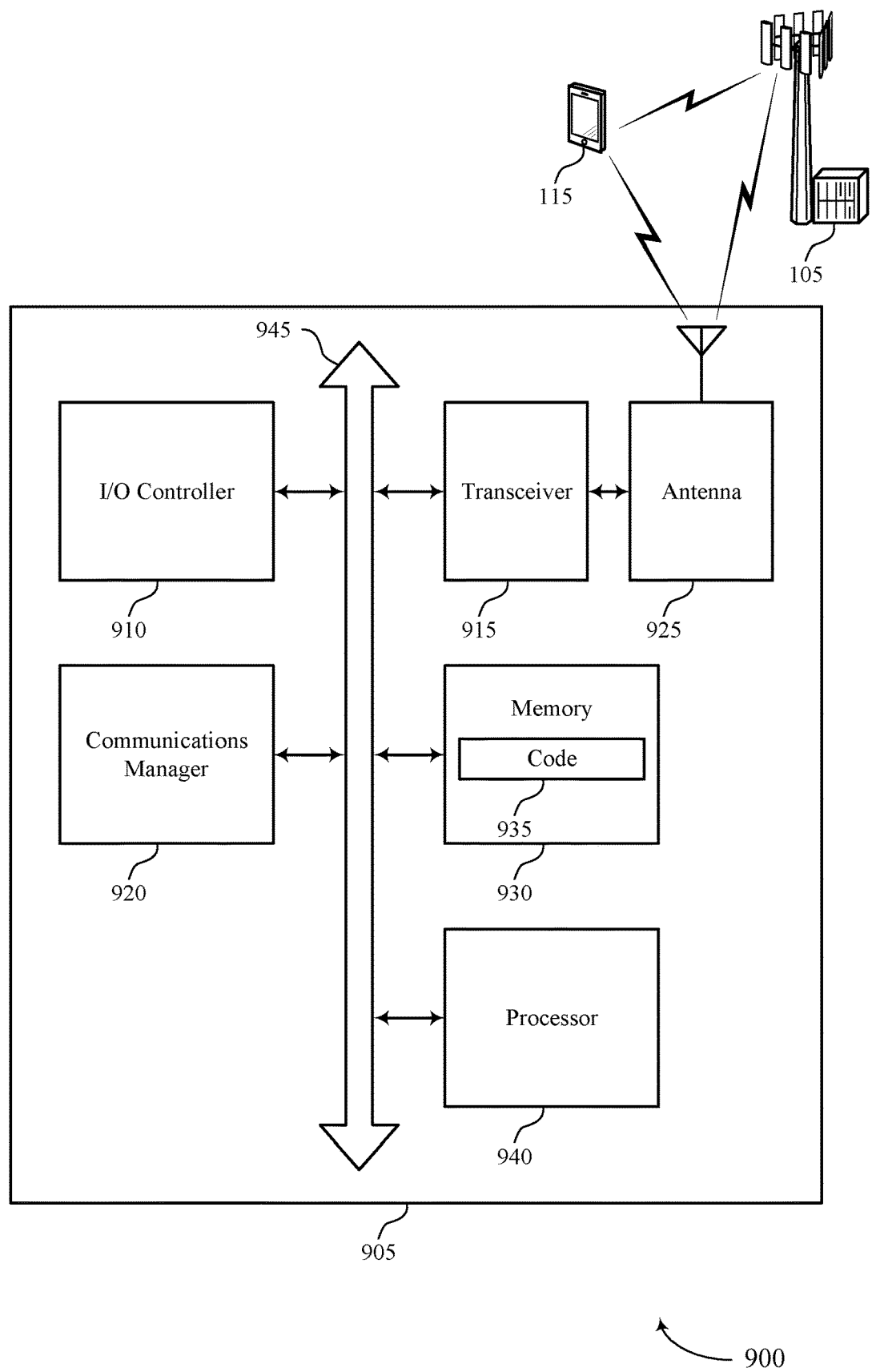
FIG. 9 shows a diagram of a system including a device that supports transmit diversity power leakage detection and filtering in antenna compensator power detector in accordance with aspects of the present disclosure.

FIG. 9 shows a diagram of a system 900 including a device 905 that supports transmit diversity power leakage detection and filtering in antenna compensator power detector in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting transmit diversity power leakage detection and filtering in antenna compensator power detector). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for measuring a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas. The communications manager 920 may be configured as or otherwise support a means for applying a leakage detection function to the set of multiple pulses to filter out the second set of pulses from the first set of pulses. The communications manager 920 may be configured as or otherwise support a means for performing an antenna compensation operation based on applying the leakage detection function.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of transmit diversity power leakage detection and filtering in antenna compensator power detector as described herein, or the processor 940 and the memory 930 may be otherwise configured to perform or support such operations.

Figure 10:
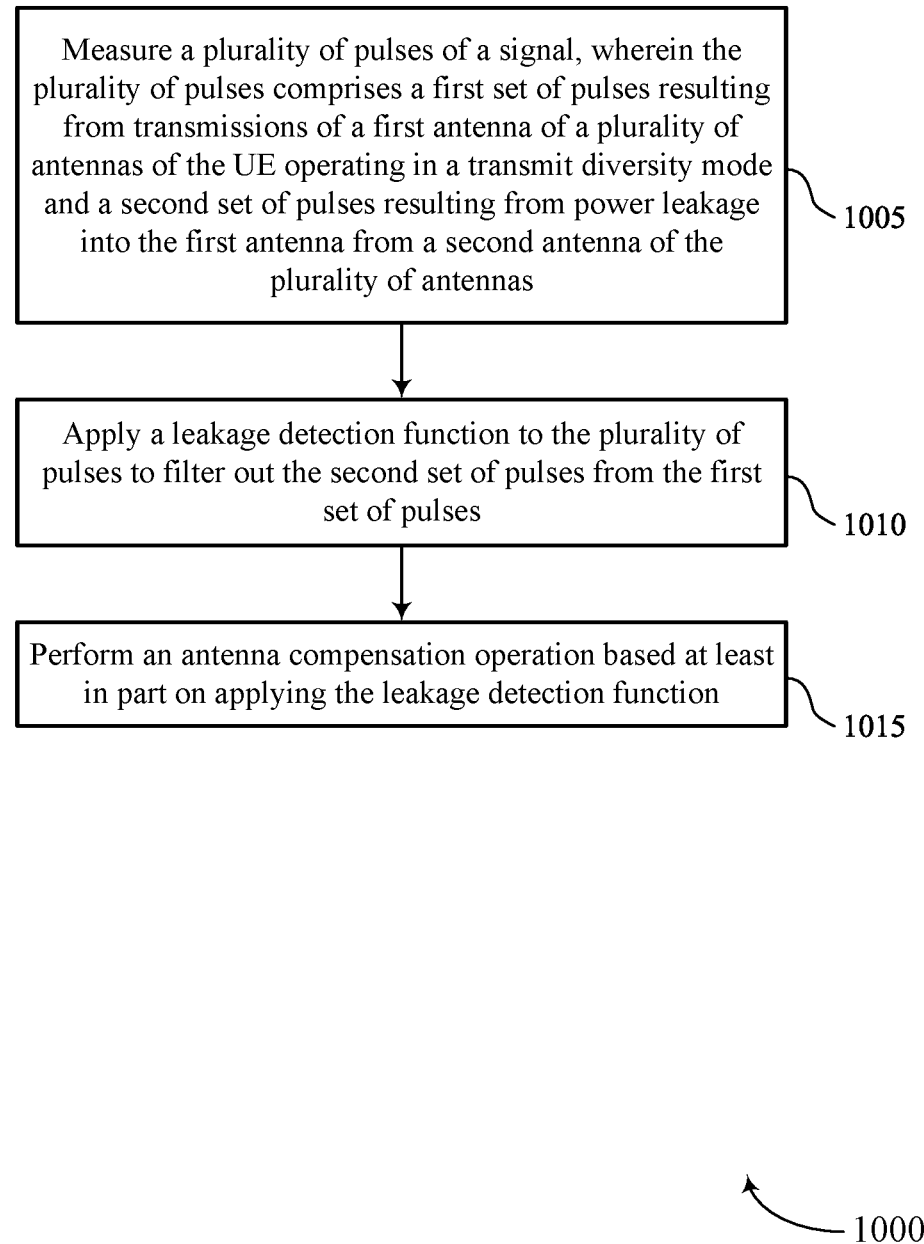
FIGS. 10 through 13 show flowcharts illustrating methods that support transmit diversity power leakage detection and filtering in antenna compensator power detector in accordance with aspects of the present disclosure.

FIG. 10 shows a flowchart illustrating a method 1000 that supports transmit diversity power leakage detection and filtering in antenna compensator power detector in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include measuring a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas. The operations of 1005 may be performed in accordance with examples as disclosed herein. In some examples, aspects of the operations of 1005 may be performed by a pulse measuring component 825 as described with reference to FIG. 8.

At 1010, the method may include applying a leakage detection function to the set of multiple pulses to filter out the second set of pulses from the first set of pulses. The operations of 1010 may be performed in accordance with examples as disclosed herein. In some examples, aspects of the operations of 1010 may be performed by a function applying component 830 as described with reference to FIG. 8.

At 1015, the method may include performing an antenna compensation operation based on applying the leakage detection function. The operations of 1015 may be performed in accordance with examples as disclosed herein. In some examples, aspects of the operations of 1015 may be performed by an operation performing component 835 as described with reference to FIG. 8.

Figure 11:
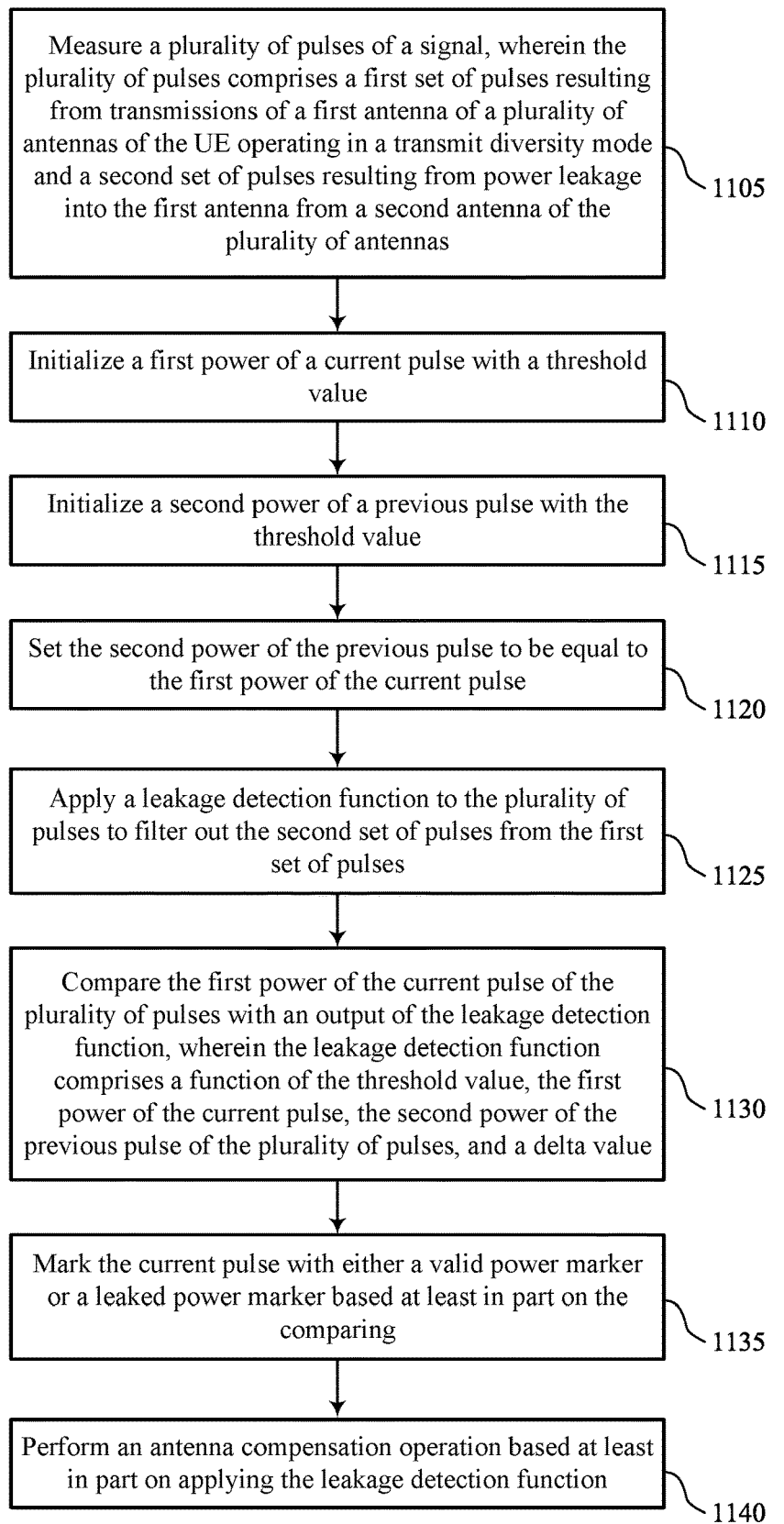

FIG. 11 shows a flowchart illustrating a method 1100 that supports transmit diversity power leakage detection and filtering in antenna compensator power detector in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include measuring a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas. The operations of 1105 may be performed in accordance with examples as disclosed herein. In some examples, aspects of the operations of 1105 may be performed by a pulse measuring component 825 as described with reference to FIG. 8.

At 1110, the method may include initializing a first power of a current pulse with a threshold value. The operations of 1110 may be performed in accordance with examples as disclosed herein. In some examples, aspects of the operations of 1110 may be performed by an initializing component 865 as described with reference to FIG. 8.

At 1115, the method may include initializing a second power of a previous pulse with the threshold value. The operations of 1115 may be performed in accordance with examples as disclosed herein. In some examples, aspects of the operations of 1115 may be performed by an initializing component 865 as described with reference to FIG. 8.

At 1120, the method may include setting the second power of the previous pulse to be equal to the first power of the current pulse. The operations of 1120 may be performed in accordance with examples as disclosed herein. In some examples, aspects of the operations of 1120 may be performed by a setting equal component 870 as described with reference to FIG. 8.

At 1125, the method may include applying a leakage detection function to the set of multiple pulses to filter out the second set of pulses from the first set of pulses. The operations of 1125 may be performed in accordance with examples as disclosed herein. In some examples, aspects of the operations of 1125 may be performed by a function applying component 830 as described with reference to FIG. 8.

At 1130, the method may include comparing the first power of the current pulse of the set of multiple pulses with an output of the leakage detection function, where the leakage detection function includes a function of the threshold value, the first power of the current pulse, the second power of the previous pulse of the set of multiple pulses, and a delta value. The operations of 1130 may be performed in accordance with examples as disclosed herein. In some examples, aspects of the operations of 1130 may be performed by a comparing component 855 as described with reference to FIG. 8.

At 1135, the method may include marking the current pulse with either a valid power marker or a leaked power marker based on the comparing. The operations of 1135 may be performed in accordance with examples as disclosed herein. In some examples, aspects of the operations of 1135 may be performed by a marking component 860 as described with reference to FIG. 8.

At 1140, the method may include performing an antenna compensation operation based on applying the leakage detection function. The operations of 1140 may be performed in accordance with examples as disclosed herein. In some examples, aspects of the operations of 1140 may be performed by an operation performing component 835 as described with reference to FIG. 8.

Figure 12:
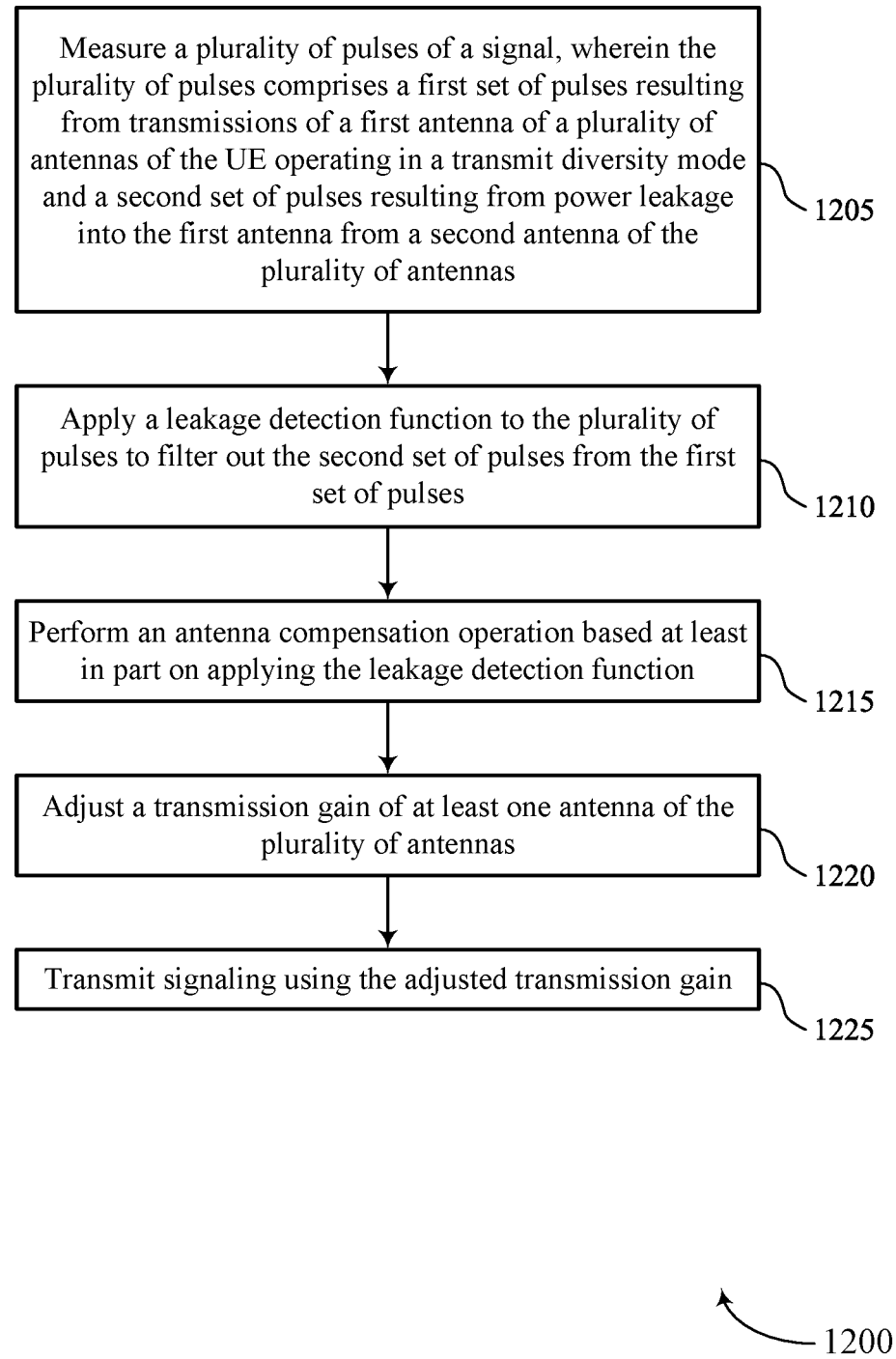

FIG. 12 shows a flowchart illustrating a method 1200 that supports transmit diversity power leakage detection and filtering in antenna compensator power detector in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include measuring a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas. The operations of 1205 may be performed in accordance with examples as disclosed herein. In some examples, aspects of the operations of 1205 may be performed by a pulse measuring component 825 as described with reference to FIG. 8.

At 1210, the method may include applying a leakage detection function to the set of multiple pulses to filter out the second set of pulses from the first set of pulses. The operations of 1210 may be performed in accordance with examples as disclosed herein. In some examples, aspects of the operations of 1210 may be performed by a function applying component 830 as described with reference to FIG. 8.

At 1215, the method may include performing an antenna compensation operation based on applying the leakage detection function. The operations of 1215 may be performed in accordance with examples as disclosed herein. In some examples, aspects of the operations of 1215 may be performed by an operation performing component 835 as described with reference to FIG. 8.

At 1220, the method may include adjusting a transmission gain of at least one antenna of the set of multiple antennas. The operations of 1220 may be performed in accordance with examples as disclosed herein. In some examples, aspects of the operations of 1220 may be performed by a transmission gain adjusting component 840 as described with reference to FIG. 8.

At 1225, the method may include transmitting signaling using the adjusted transmission gain. The operations of 1225 may be performed in accordance with examples as disclosed herein. In some examples, aspects of the operations of 1225 may be performed by a transmitting component 845 as described with reference to FIG. 8.

Figure 13:
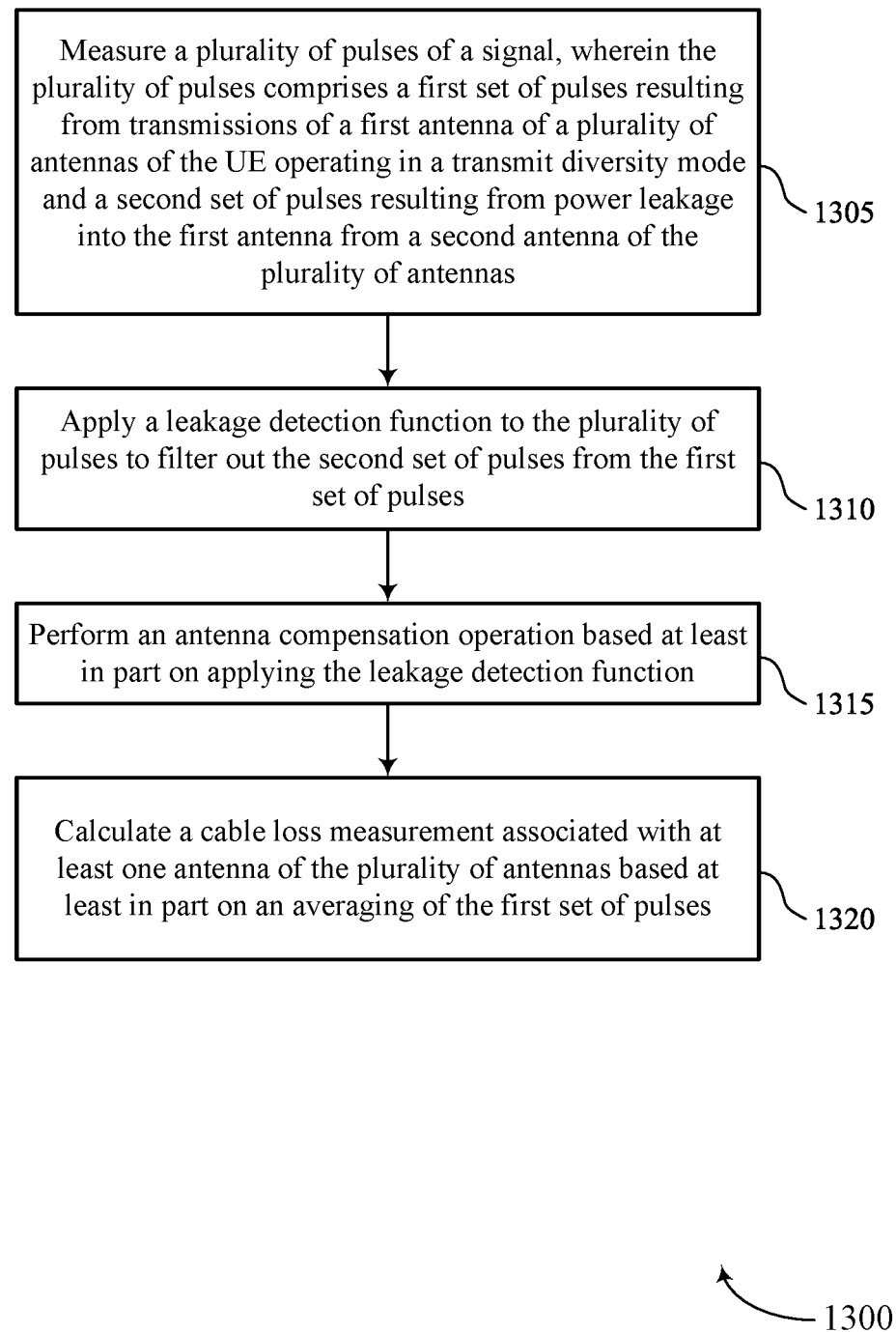

FIG. 13 shows a flowchart illustrating a method 1300 that supports transmit diversity power leakage detection and filtering in antenna compensator power detector in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include measuring a set of multiple pulses of a signal, where the set of multiple pulses includes a first set of pulses resulting from transmissions of a first antenna of a set of multiple antennas of the UE operating in a transmit diversity mode and a second set of pulses resulting from power leakage into the first antenna from a second antenna of the set of multiple antennas. The operations of 1305 may be performed in accordance with examples as disclosed herein. In some examples, aspects of the operations of 1305 may be performed by a pulse measuring component 825 as described with reference to FIG. 8.

At 1310, the method may include applying a leakage detection function to the set of multiple pulses to filter out the second set of pulses from the first set of pulses. The operations of 1310 may be performed in accordance with examples as disclosed herein. In some examples, aspects of the operations of 1310 may be performed by a function applying component 830 as described with reference to FIG. 8.

At 1315, the method may include performing an antenna compensation operation based on applying the leakage detection function. The operations of 1315 may be performed in accordance with examples as disclosed herein. In some examples, aspects of the operations of 1315 may be performed by an operation performing component 835 as described with reference to FIG. 8.

At 1320, the method may include calculating a cable loss measurement associated with at least one antenna of the set of multiple antennas based on an averaging of the first set of pulses. The operations of 1320 may be performed in accordance with examples as disclosed herein. In some examples, aspects of the operations of 1320 may be performed by a cable loss measurement calculating component 850 as described with reference to FIG. 8.

The following provides an overview of aspects of the present disclosure:

Aspect 1: A method for wireless communication at a UE, comprising: measuring a plurality of pulses of a signal, wherein the plurality of pulses comprises a first set of pulses resulting from transmissions of a first antenna of a plurality of antennas of the UE operating in a transmit diversity mode and a second set of pulses resulting from power leakage into the first antenna from a second antenna of the plurality of antennas; applying a leakage detection function to the plurality of pulses to filter out the second set of pulses from the first set of pulses; and performing an antenna compensation operation based at least in part on applying the leakage detection function.

Aspect 2: The method of aspect 1, wherein performing the antenna compensation operation comprises: adjusting a transmission gain of at least one antenna of the plurality of antennas; and transmitting signaling using the adjusted transmission gain.

Aspect 3: The method of any of aspects 1 through 2, wherein performing the antenna compensation operation comprises: calculating a cable loss measurement associated with at least one antenna of the plurality of antennas based at least in part on an averaging of the first set of pulses.

Aspect 4: The method of any of aspects 1 through 3, wherein applying the leakage detection function comprises: comparing a first power of a current pulse of the plurality of pulses with an output of the leakage detection function, wherein the leakage detection function comprises a function of a threshold value, the first power of the current pulse, a second power of a previous pulse of the plurality of pulses, and a delta value; marking the current pulse with either a valid power marker or a leaked power marker based at least in part on the comparing.

Aspect 5: The method of aspect 4, wherein the leakage detection function comprises a maximum of a first value and a second value, the first value is the threshold value, and the second value is a sum of the delta value and a maximum of a third value and a fourth value, the third value is the first power of the current pulse, and the fourth value is the second power of the previous pulse.

Aspect 6: The method of any of aspects 4 through 5, wherein the threshold value is a constant value that represents a minimum valid power for the current pulse.

Aspect 7: The method of any of aspects 4 through 6, wherein the delta value is a constant value that represents a minimum difference in power between the first power of the current pulse and the second power of the previous pulse for determining that the current pulse is a leaked pulse.

Aspect 8: The method of any of aspects 4 through 7, further comprising: initializing the first power of the current pulse with the threshold value; and initializing the second power of the previous pulse with the threshold value.

Aspect 9: The method of any of aspects 4 through 8, further comprising: setting the second power of the previous pulse to be equal to the first power of the current pulse.

Aspect 10: The method of any of aspects 1 through 9, further comprising: measuring the plurality of pulses of the signal at a compensator coupled with the second antenna.

Aspect 11: The method of any of aspects 1 through 10, wherein the plurality of pulses of the signal comprises an alternating pattern of valid pulses corresponding to the first set of pulses and leaked pulses corresponding to the second set of pulses.

Aspect 12: An apparatus for wireless communication at a UE, comprising a processor; memory coupled with the processor; and instructions stored in the memory and executable by the processor to cause the apparatus to perform a method of any of aspects 1 through 11.

Aspect 13: An apparatus for wireless communication at a UE, comprising at least one means for performing a method of any of aspects 1 through 11.

Aspect 14: A non-transitory computer-readable medium storing code for wireless communication at a UE, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
   measure a plurality of pulses of a signal, wherein the plurality of pulses comprises a first set of pulses resulting from first power supplied to a first cable for transmissions from a first antenna of a plurality of antennas of the UE operating in a transmit diversity mode and a second set of pulses resulting from power leakage into the first first cable, wherein the power leakage into the first cable results from an electrical component supplying second power to a second cable for transmissions from a second antenna of the plurality of antennas;
   apply a leakage detection function to the plurality of pulses to filter out the second set of pulses from the first set of pulses; and
   perform an antenna compensation operation based at least in part on applying the leakage detection function.

2. The apparatus of claim 1, wherein the instructions to perform the antenna compensation operation are executable by the processor to cause the apparatus to:
   adjust a transmission gain of at least one antenna of the plurality of antennas; and
   transmit signaling using the adjusted transmission gain.

3. The apparatus of claim 1, wherein the instructions to perform the antenna compensation operation are executable by the processor to cause the apparatus to:
   calculate a cable loss measurement associated with at least one antenna of the plurality of antennas based at least in part on an averaging of the first set of pulses.

4. The apparatus of claim 1, wherein the instructions to apply the leakage detection function are executable by the processor to cause the apparatus to:
   compare a third power of a current pulse of the plurality of pulses with an output of the leakage detection function, wherein the leakage detection function comprises a function of a threshold value, the third power of the current pulse, a fourth power of a previous pulse of the plurality of pulses, and a delta value; and
   mark the current pulse with either a valid power marker or a leaked power marker based at least in part on the comparing.

5. The apparatus of claim 4, wherein:
   the leakage detection function comprises a maximum of a first value and a second value, the first value is the threshold value, and the second value is a sum of the delta value and a maximum of a third value and a fourth value, the third value is the first power of the current pulse, and the fourth value is the second power of the previous pulse.

6. The apparatus of claim 4, wherein the threshold value is a constant value that represents a minimum valid power for the current pulse.

7. The apparatus of claim 4, wherein the delta value is a constant value that represents a minimum difference in power between the first power of the current pulse and the second power of the previous pulse for determining that the current pulse is a leaked pulse.

8. The apparatus of claim 4, wherein the instructions are further executable by the processor to cause the apparatus to:
   initialize the first power of the current pulse with the threshold value; and
   initialize the second power of the previous pulse with the threshold value.

9. The apparatus of claim 4, wherein the instructions are further executable by the processor to cause the apparatus to:
   set the second power of the previous pulse to be equal to the first power of the current pulse.

10. The apparatus of claim 1, wherein the instructions are further executable by the processor to cause the apparatus to:
    measure the plurality of pulses of the signal at a compensator coupled with the first antenna.

11. The apparatus of claim 1, wherein the plurality of pulses of the signal comprises an alternating pattern of valid pulses corresponding to the first set of pulses and leaked pulses corresponding to the second set of pulses.

12. A method for wireless communication at a user equipment (UE), comprising:
    measuring a plurality of pulses of a signal, wherein the plurality of pulses comprises a first set of pulses resulting from first power supplied to a first cable for transmissions from a first antenna of a plurality of antennas of the UE operating in a transmit diversity mode and a second set of pulses resulting from power leakage into the first cable, wherein the power leakage into the first cable results from an electrical component supplying second power to a second cable for transmissions from a second antenna of the plurality of antennas;
    applying a leakage detection function to the plurality of pulses to filter out the second set of pulses from the first set of pulses; and
    performing an antenna compensation operation based at least in part on applying the leakage detection function.

13. The method of claim 12, wherein performing the antenna compensation operation comprises:
    adjusting a transmission gain of at least one antenna of the plurality of antennas; and
    transmitting signaling using the adjusted transmission gain.

14. The method of claim 12, wherein performing the antenna compensation operation comprises:

calculating a cable loss measurement associated with at least one antenna of the plurality of antennas based at least in part on an averaging of the first set of pulses.

15. The method of claim 12, wherein applying the leakage detection function comprises:
comparing a third power of a current pulse of the plurality of pulses with an output of the leakage detection function, wherein the leakage detection function comprises a function of a threshold value, the third power of the current pulse, a fourth power of a previous pulse of the plurality of pulses, and a delta value; and
marking the current pulse with either a valid power marker or a leaked power marker based at least in part on the comparing.

16. The method of claim 15, wherein
the leakage detection function comprises a maximum of a first value and a second value, the first value is the threshold value, and the second value is a sum of the delta value and a maximum of a third value and a fourth value, the third value is the first power of the current pulse, and the fourth value is the second power of the previous pulse.

17. The method of claim 15, wherein the threshold value is a constant value that represents a minimum valid power for the current pulse.

18. The method of claim 15, wherein the delta value is a constant value that represents a minimum difference in power between the first power of the current pulse and the second power of the previous pulse for determining that the current pulse is a leaked pulse.

19. The method of claim 15, further comprising:
initializing the first power of the current pulse with the threshold value; and
initializing the second power of the previous pulse with the threshold value.

20. The method of claim 15, further comprising:
setting the second power of the previous pulse to be equal to the first power of the current pulse.

21. The method of claim 12, further comprising:
measuring the plurality of pulses of the signal at a compensator coupled with the first antenna.

22. The method of claim 12, wherein the plurality of pulses of the signal comprises an alternating pattern of valid pulses corresponding to the first set of pulses and leaked pulses corresponding to the second set of pulses.

23. An apparatus for wireless communication at a user equipment (UE), comprising:
means for measuring a plurality of pulses of a signal, wherein the plurality of pulses comprises a first set of pulses resulting from first power supplied to a first cable for transmissions from a first antenna of a plurality of antennas of the UE operating in a transmit diversity mode and a second set of pulses resulting from power leakage into the first cable, wherein the power leakage into the first cable results from an electrical component supplying second power to a second cable for transmissions from a second antenna of the plurality of antennas;
means for applying a leakage detection function to the plurality of pulses to filter out the second set of pulses from the first set of pulses; and
means for performing an antenna compensation operation based at least in part on applying the leakage detection function.

24. The apparatus of claim 23, wherein the means for performing the antenna compensation operation comprise:
means for adjusting a transmission gain of at least one antenna of the plurality of antennas; and
means for transmitting signaling using the adjusted transmission gain.

25. The apparatus of claim 23, wherein the means for performing the antenna compensation operation comprise:
means for calculating a cable loss measurement associated with at least one antenna of the plurality of antennas based at least in part on an averaging of the first set of pulses.

26. The apparatus of claim 23, wherein the means for applying the leakage detection function comprise:
means for comparing a third power of a current pulse of the plurality of pulses with an output of the leakage detection function, wherein the leakage detection function comprises a function of a threshold value, the third power of the current pulse, a fourth power of a previous pulse of the plurality of pulses, and a delta value; and
means for marking the current pulse with either a valid power marker or a leaked power marker based at least in part on the comparing.

27. A non-transitory computer-readable medium storing code for wireless communication at a user equipment (UE), the code comprising instructions executable by a processor to:
measure a plurality of pulses of a signal, wherein the plurality of pulses comprises a first set of pulses resulting from first power supplied to a first cable for transmissions from a first antenna of a plurality of antennas of the UE operating in a transmit diversity mode and a second set of pulses resulting from power leakage into the first cable, wherein the power leakage into the first cable results from an electrical component supplying second power to a second cable for transmissions from a second antenna of the plurality of antennas;
apply a leakage detection function to the plurality of pulses to filter out the second set of pulses from the first set of pulses; and
perform an antenna compensation operation based at least in part on applying the leakage detection function.

28. The non-transitory computer-readable medium of claim 27, wherein the instructions to perform the antenna compensation operation are executable by the processor to:
adjust a transmission gain of at least one antenna of the plurality of antennas; and
transmit signaling using the adjusted transmission gain.

29. The non-transitory computer-readable medium of claim 27, wherein the instructions to perform the antenna compensation operation are executable by the processor to:
calculate a cable loss measurement associated with at least one antenna of the plurality of antennas based at least in part on an averaging of the first set of pulses.

30. The non-transitory computer-readable medium of claim 27, wherein the instructions to apply the leakage detection function are executable by the processor to:
compare a third power of a current pulse of the plurality of pulses with an output of the leakage detection function, wherein the leakage detection function comprises a function of a threshold value, the third power of the current pulse, a fourth power of a previous pulse of the plurality of pulses, and a delta value; and
mark the current pulse with either a valid power marker or a leaked power marker based at least in part on the comparing.

* * * * *